(12) United States Patent
Tateno et al.

(10) Patent No.: US 11,989,029 B2
(45) Date of Patent: *May 21, 2024

(54) INFORMATION PROCESSING APPARATUS, INFORMATION PROCESSING METHOD, INFORMATION PROCESSING SYSTEM, AND STORAGE MEDIUM

(71) Applicant: CANON KABUSHIKI KAISHA, Tokyo (JP)

(72) Inventors: Keisuke Tateno, Kawasaki (JP); Makoto Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,787

(22) Filed: Jan. 12, 2023

(65) Prior Publication Data

US 2023/0168686 A1    Jun. 1, 2023

Related U.S. Application Data

(63) Continuation of application No. 16/550,074, filed on Aug. 23, 2019, now Pat. No. 11,573,574.

(30) Foreign Application Priority Data

Aug. 30, 2018  (JP) ................................. 2018-161414
Jul. 22, 2019  (JP) ................................. 2019-134500

(51) Int. Cl.
*G05D 1/00*    (2006.01)

(52) U.S. Cl.
CPC ......... *G05D 1/0251* (2013.01); *G05D 1/0038* (2013.01); *G05D 1/0088* (2013.01);
(Continued)

(58) Field of Classification Search
None
See application file for complete search history.

(56) References Cited

U.S. PATENT DOCUMENTS 9,358,975 B1 * 6/2016 Watts .................. G05D 1/0011
2012/0197464 A1 * 8/2012 Wang ................. G06F 3/04842
701/28

(Continued)

FOREIGN PATENT DOCUMENTS

CN    106156752 A    11/2016
JP    5-19848 A    1/1993
(Continued)

*Primary Examiner* — Rebecca A Volentine
(74) *Attorney, Agent, or Firm* — Canon U.S.A., Inc., IP Division

(57) ABSTRACT

An information processing apparatus for determining control values for controlling a position of a vehicle for conveying a cargo includes an acquisition unit configured to acquire first information for identifying a three-dimensional shape of the cargo based on a captured first image of the cargo, and second information for identifying, based on a captured second image of an environment where the vehicle moves, a distance between an object in the environment and the vehicle, and a determination unit configured to, based on the first information and the second information, determine the control values for preventing the cargo and the object from coming closer than a predetermined distance.

16 Claims, 14 Drawing Sheets

(52) U.S. Cl.
CPC ......... *G05D 1/0214* (2013.01); *G05D 1/0219* (2013.01); *G05D 1/0221* (2013.01); *B60R 2300/301* (2013.01); *B60R 2300/302* (2013.01)

(56) References Cited

U.S. PATENT DOCUMENTS

| | | | |
|---|---|---|---|
| 2017/0183155 A1* | 6/2017 | Kazama | G05D 1/0223 |
| 2019/0194005 A1* | 6/2019 | Shah | G05D 1/024 |
| 2020/0066036 A1* | 2/2020 | Choi | G06T 7/75 |

FOREIGN PATENT DOCUMENTS

| | | |
|---|---|---|
| JP | 7-315763 A | 12/1995 |
| JP | 2008-225704 A | 9/2008 |
| JP | 2010-44530 A | 2/2010 |
| JP | 2015-68141 A | 4/2015 |
| JP | 2016-218933 A | 12/2016 |
| JP | 2017-97847 A | 6/2017 |
| WO | 2016/103452 A1 | 6/2016 |

* cited by examiner

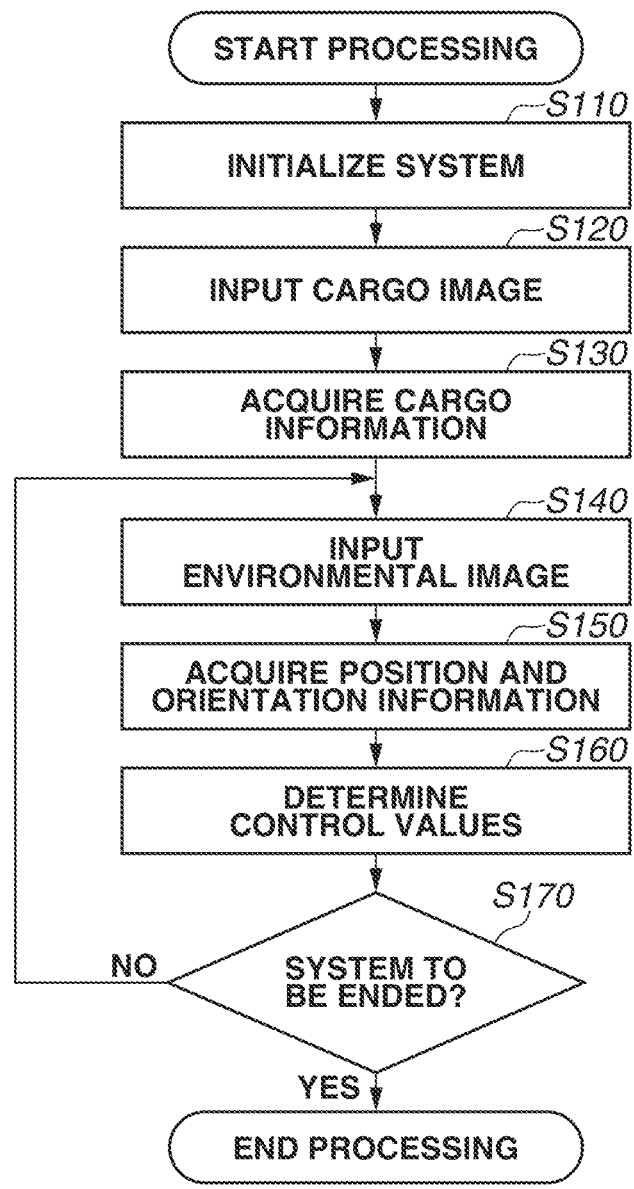

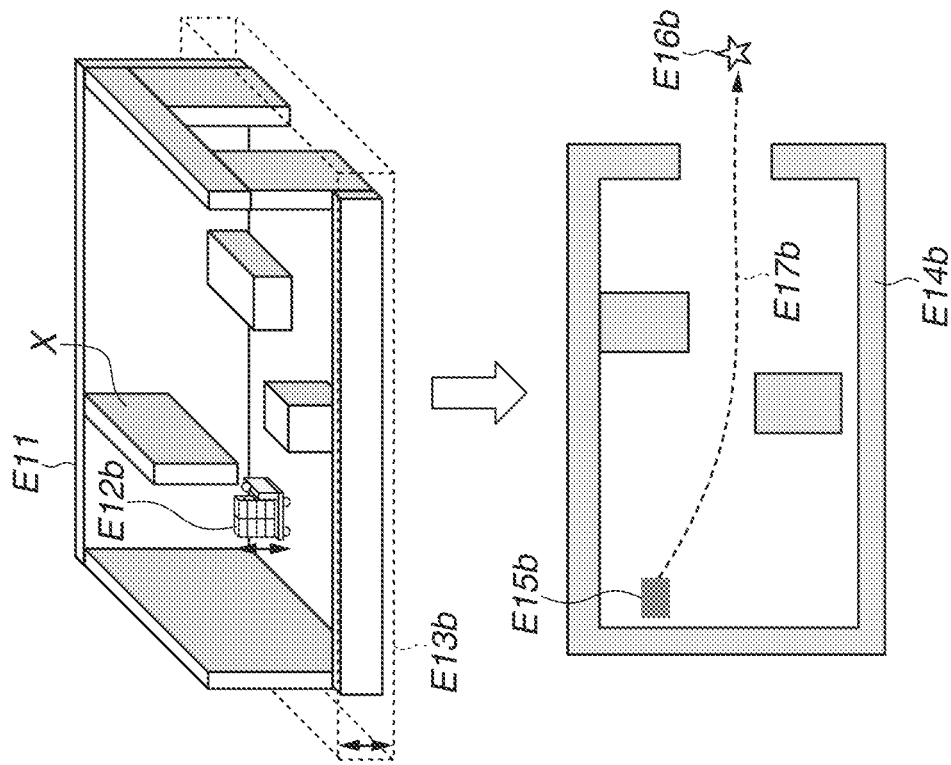
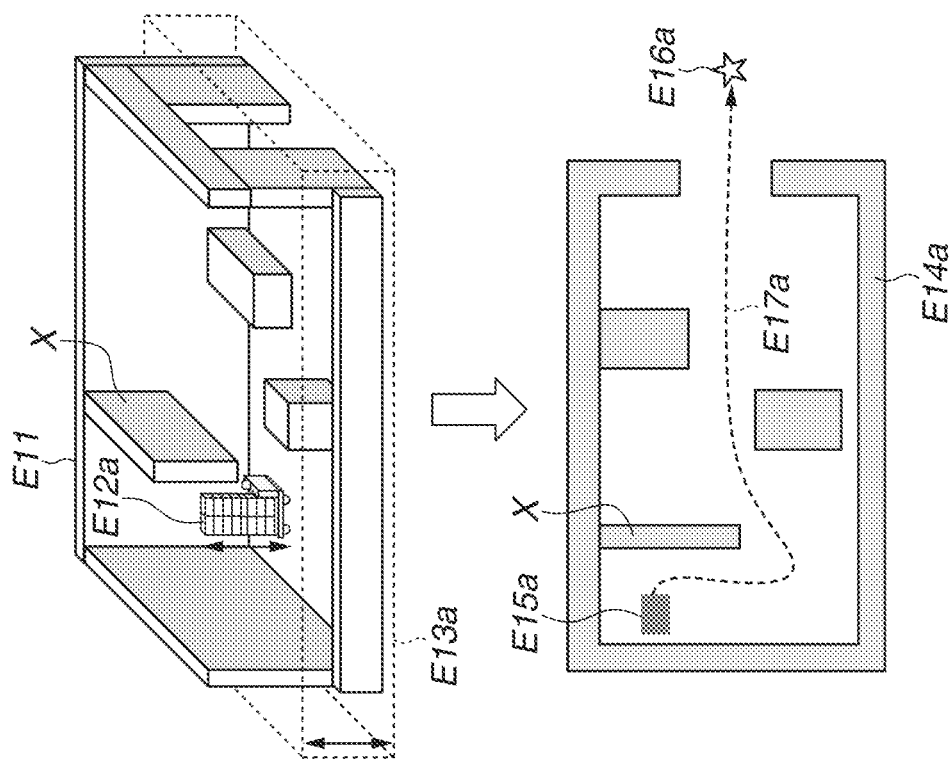

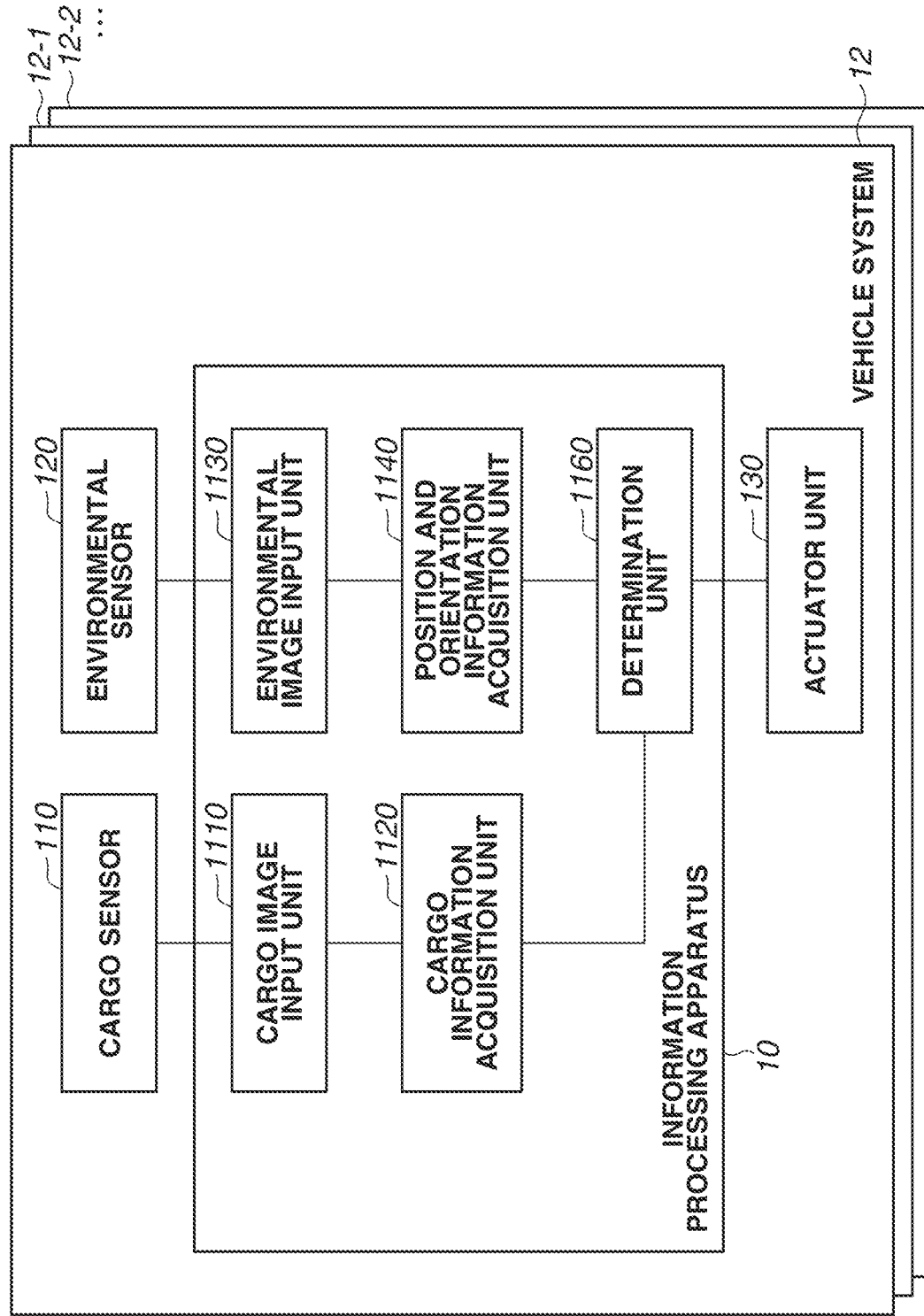

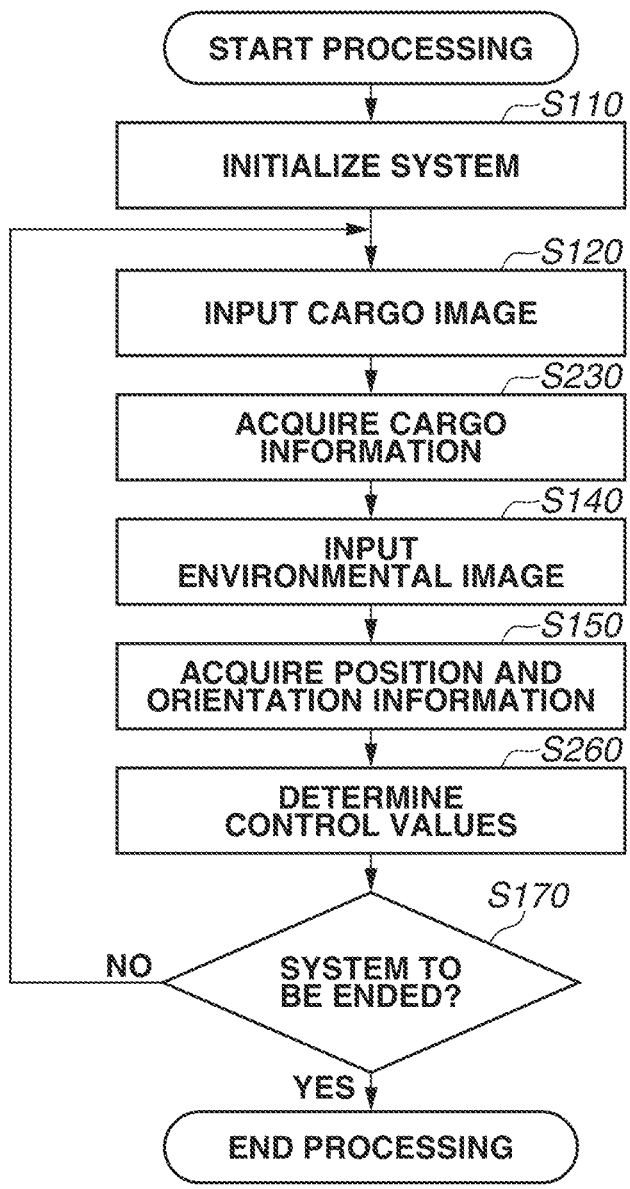

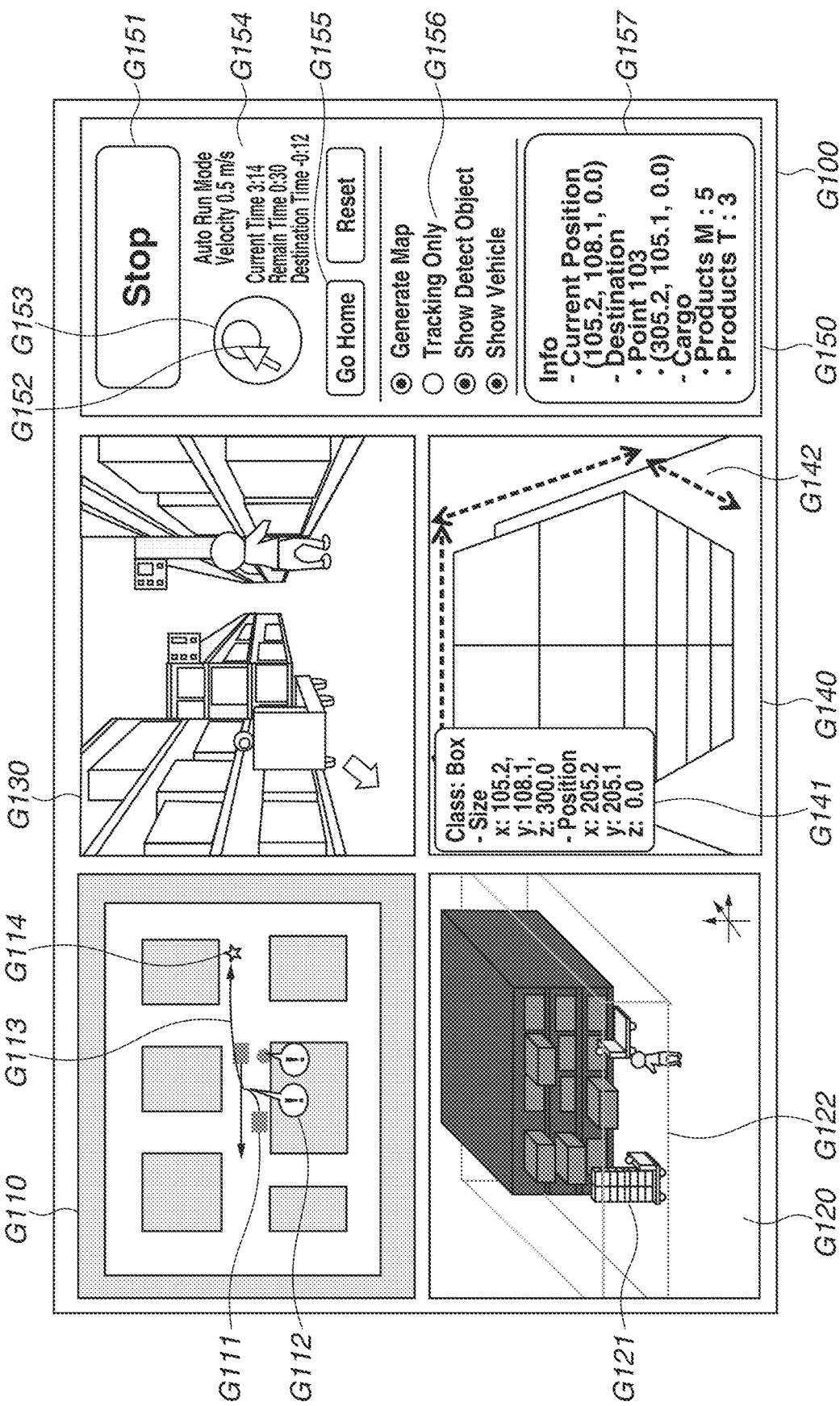

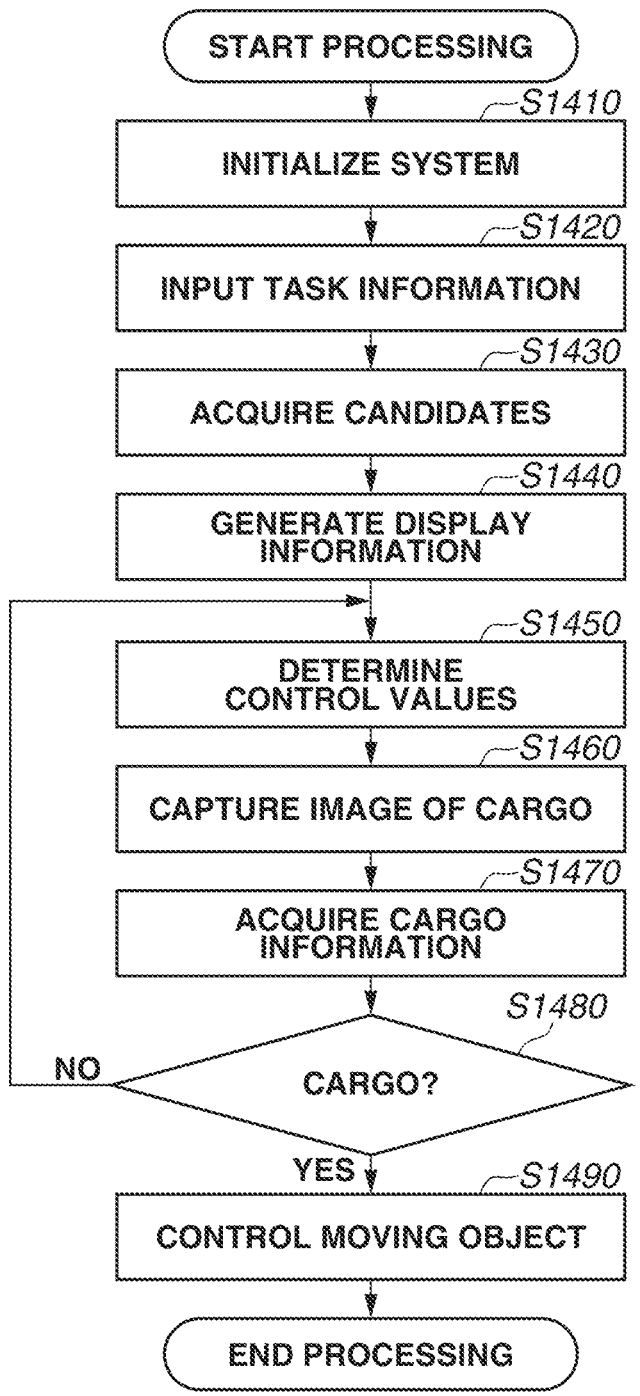

INFORMATION PROCESSING APPARATUS, INFORMATION PROCESSING METHOD, INFORMATION PROCESSING SYSTEM, AND STORAGE MEDIUM

CROSS-REFERENCE TO RELATED APPLICATIONS

This is a continuation application of U.S. patent application Ser. No. 16/550,074 filed on Aug. 23, 2019 claims the benefit of Japanese Patent Applications No. 2018-161414, filed Aug. 30, 2018, and No. 2019-134500, filed Jul. 22, 2019, all of which are hereby incorporated by reference herein in their entirety.

BACKGROUND

Field

The present disclosure relates to a technique for performing movement control of a vehicle.

Description of the Related Art

There is an example of a vehicle called an automated guided vehicle (AGV). Conventionally, when running this vehicle in such an environment as a factory or a distribution warehouse, a certain technique is used to stably perform movement control on the vehicle. For example, a technique discussed in Japanese Patent Application Laid-Open No. 2010-33434 is known to run a vehicle while detecting a tape stuck on the floor, by using a sensor mounted on the vehicle.

However, in order to stably move the vehicle loaded with unspecified cargos, it is necessary to change the moving path according to the amount and shape of the cargo to be loaded on the vehicle. More specifically, it has been necessary to manually set a running path such that the vehicle runs while maintaining a suitable distance between an obstacle in the environment and the vehicle or cargo.

SUMMARY

The present disclosure is directed to stably performing movement control of a vehicle capable of loading a plurality of types of cargos.

According to an aspect of the present disclosure, an information processing apparatus for determining control values for controlling a position of a vehicle for conveying a cargo is provided. The apparatus includes an acquisition unit configured to acquire first information for identifying a three-dimensional shape of the cargo based on a captured first image of the cargo, and second information for identifying, based on a captured second image of an environment where the vehicle moves, a distance between an object in the environment and the vehicle, and a determination unit configured to, based on the first information and the second information, determine the control values for preventing the cargo and the object from coming closer than a predetermined distance.

Further features will become apparent from the following description of exemplary embodiments with reference to the attached drawings.

BRIEF DESCRIPTION OF THE DRAWINGS

FIG. 5 is a flowchart illustrating processing performed by the information processing apparatus.

FIGS. 6A and 6B illustrate an example of a running path of the vehicle system.

FIG. 7 is a block diagram illustrating another example of a functional configuration of the vehicle system.

FIG. 8 is a flowchart illustrating another processing performed by the information processing apparatus performs.

FIG. 9 illustrates an example of a graphical user interface (GUI) for presenting display information.

FIG. 14 is a flowchart illustrating still another processing performed by the information processing apparatus.

DESCRIPTION OF THE EMBODIMENTS

Exemplary embodiments will be described below with reference to the accompanying drawings. Configurations described in the following exemplary embodiments are to be considered as illustrative, and the present disclosure is not limited to the illustrated configurations.

Figure 1:
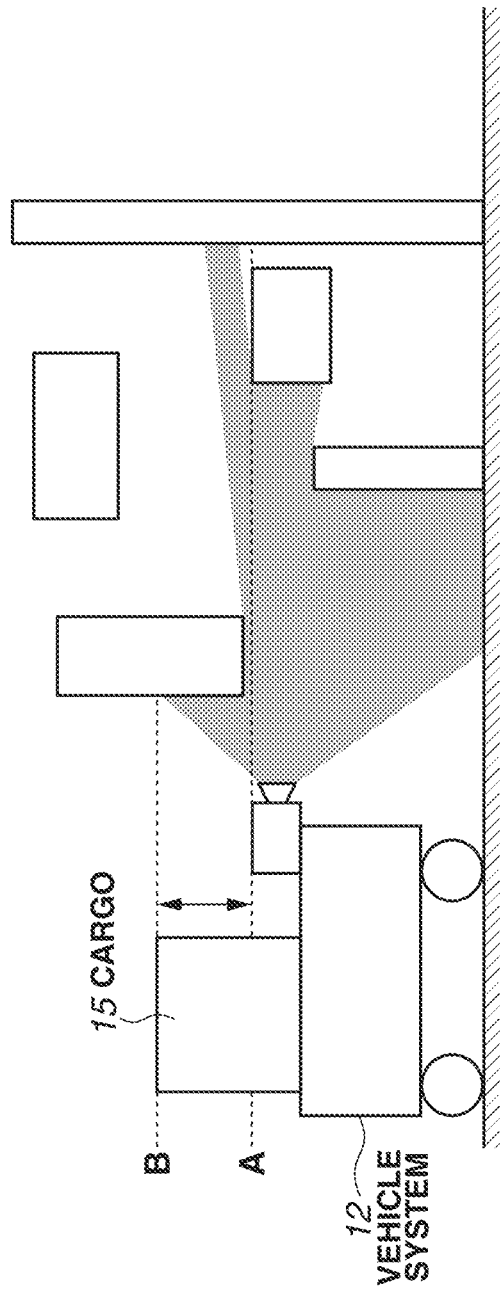
FIG. 1 illustrates an example of an environment where a vehicle system runs.
Figure 2:
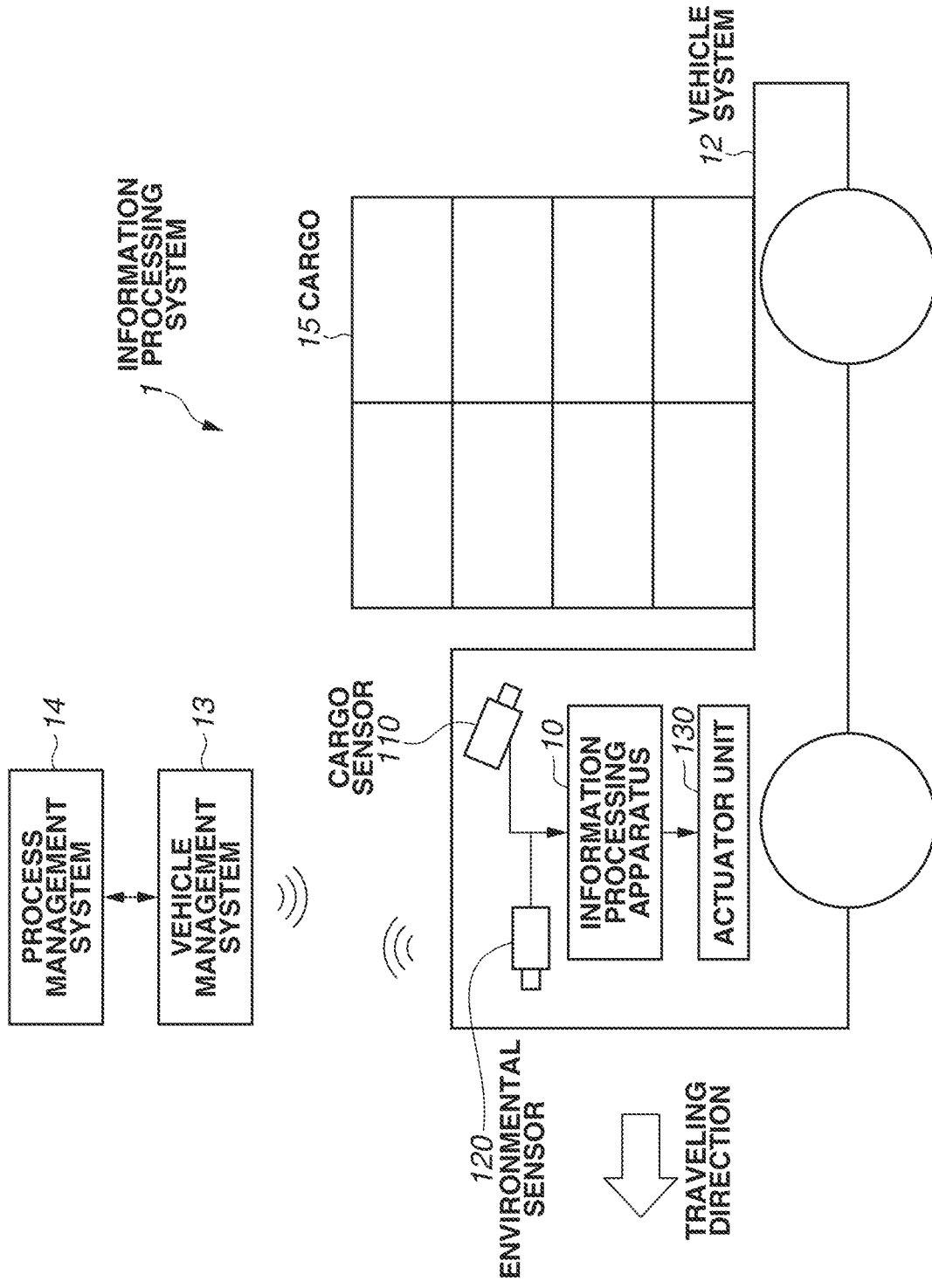
FIG. 2 illustrates an example of a system configuration of an information processing system.

A first exemplary embodiment will be described below centering on movement control of an automated guided vehicle (AGV) loading a cargo. Hereinafter, the automated guided vehicle is referred to as a vehicle. This vehicle is capable of loading a plurality of types of cargos. A passable path for the vehicle changes with the shape of the cargo loaded on the vehicle. A vehicle system 12 is capable of recognizing a three-dimensional structure of a space based on an image of a camera mounted on the vehicle body. Referring to FIG. 1, when the vehicle moves in the environment where there are beams in a ceiling and protrusions of walls and shelfs, a passable path for the vehicle depends on the presence and height of the cargo. More specifically, when the height of the cargo is lower than the dashed line A, the vehicle system 12 can advance straight ahead. However, since the height of a cargo 15 reaches the dashed line B in this case, movement control needs to be performed such that the vehicle system 12 does not advance straight ahead but bypasses the straight path. Also, if the cargo 15 protrudes in the width direction of the vehicle system 12, the vehicle system 12 needs to run on a moving path in consideration of the shape of the cargo 15. A vehicle used in a factory or warehouse, such as an automated guided vehicle, conveys various cargos depending on a task, and is loaded and unloaded with cargos at specified positions. In a process for performing a certain task, the amount and size of the cargo 15 loaded on the vehicle are not necessarily constant. It has been necessary to, even if information about the shape of the cargo 15 is given first, update the information about the shape of the cargo 15 before and after loading and unloading the cargo 15. The following describes a method for determining control values (orientation and speed) for controlling the position of the vehicle such that the vehicle system 12 runs on a moving path along which the cargo 15 contacts no obstacle, based on information about the three-dimensional shape (length, height, and depth) of the cargo 15 obtained from an image. FIG. 2 illustrates an example of a configuration of an information processing system. The vehicle system 12 is controlled based on the three-dimensional shape of the cargo 15 estimated based on an image captured by a cargo sensor 110 and position and orientation information of the vehicle system 12 estimated based on an image captured by an environmental sensor 120 mounted on the vehicle system 12.

(Descriptions of Configuration)

FIG. 2 illustrates an example of a configuration of the information processing system for controlling the position of the vehicle called an AGV according to the present exemplary embodiment. An information processing system 1 according to the present exemplary embodiment includes at least one vehicle system 12, a vehicle management system 13, and a process management system 14. The information processing system 1 is, for example, a distribution system or a production system.

The vehicle system 12 is an AGV for conveying the cargo 15 according to a schedule of a process required for task execution in such an environment as a factory and a distribution warehouse. A plurality of vehicle systems 12 is moving (running) in the environment. The vehicle system 12 bidirectionally transmits and receives various kinds of information to/from the vehicle management system 13 and other vehicle systems 12 via wireless communication such as Wi-Fi communication. The vehicle system 12 mounts an information processing apparatus 10 for determining the control values for controlling the position of the vehicle, an actuator unit 130 for performing movement control on the vehicle based on the control values, the cargo sensor 110 for capturing an image of the cargo 15, and the environmental sensor 120 for observing the surrounding environment of the vehicle.

The vehicle management system 13 is a system for managing the vehicle system 12. For example, the vehicle management system 13 may be a computer server, personal computer (PC), embedded system, or programmable logic controller (PLC). The vehicle management system 13 bidirectionally transmits and receives various kinds of information for performing movement control on the vehicle system 12 to/from the vehicle system 12 via wireless communication such as Wi-Fi communication. The vehicle management system 13 communicates with the process management system 14.

The process management system 14 manages a schedule of a process in a factory and a distribution warehouse performed by the information processing system 1. For example, the process management system 14 may be a production management system, distribution management system, or Manufacturing Execution System (MES). The process management system 14 communicates with the vehicle management system 13.

The cargo 15 is a cargo conveyed by the vehicle system 12. For example, the cargo 15 is a conveyance target object such as a container storing a plurality of industrial parts, or a freight including a stack of a plurality of containers and cardboard boxes. The cargo 15 is conveyed by being loaded on or pulled by the vehicle system 12.

Figure 3:
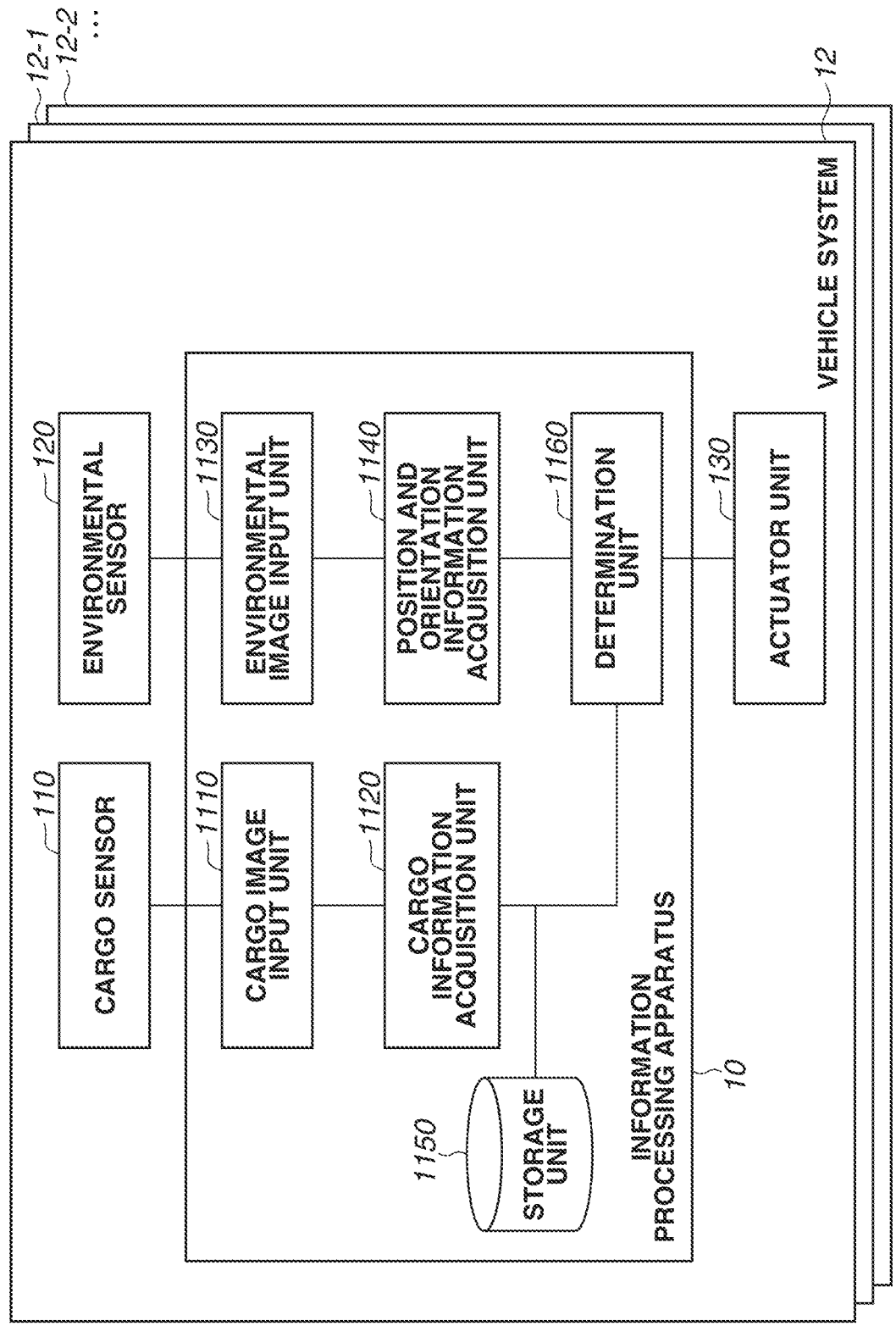
FIG. 3 is a block diagram illustrating an example of a functional configuration of the vehicle system.

FIG. 3 illustrates an example of a functional configuration of the vehicle system 12 including the information processing apparatus 10 according to the present exemplary embodiment. The information processing apparatus 10 includes a cargo image input unit 1110, a cargo information acquisition unit 1120, an environmental image input unit 1130, a position and orientation information acquisition unit 1140, a storage unit 1150, and a determination unit 1160. The cargo image input unit 1110 is connected with the cargo sensor 110 mounted on the vehicle system 12. The environmental image input unit 1130 is connected with the environmental sensor 120 mounted on the vehicle system 12. The determination unit 1160 is connected with the actuator unit 130. In addition to these units, a communication apparatus (not illustrated) bidirectionally transmits and receive information to/from the vehicle management system 13, and inputs and outputs data to/from each functional component of the information processing apparatus 10. However, FIG. 3 illustrates an example of an apparatus configuration and does not limit the scope of the present disclosure.

The cargo sensor (first sensor) 110 is a measurement apparatus for measuring the cargo 15 conveyed by the vehicle system 12. According to the present exemplary embodiment, the cargo sensor 110 is a Time-of-Flight (ToF)-based depth camera for capturing an image of a depth map in which each pixel stores depth information. The cargo sensor 110 outputs the depth map. It is assumed that the position and orientation relation between the cargo sensor 110 and the vehicle system 12, and the positional relation between the cargo sensor 110 and the environmental sensor 120 have been pre-calibrated.

The cargo sensor 110 may be, for example, a gray scale or color camera for capturing grayscale or color images, respectively. In this case, in order to estimate the shape of the cargo 15, the cargo sensor 110 directly estimates a three-dimensional bounding box representing the shape of the cargo 15, for example, by using a leaning method based on a Convolutional Neural Network (CNN) based on a color image. More specifically, the cargo sensor 110 estimates a three-dimensional shape of the cargo 15 by using a learned model (CNN) which inputs a color image and a distance value and outputs the absolute value of the size of the cargo 15. The learned model has learned in advance by using supervisory data composed of images of various objects applied with information about distance values and object sizes. Alternatively, the learned model may learn a network for estimating a depth map based on monocular color images by using a CNN and perform processing according to the present exemplary embodiment by using the depth map estimated based on the color images. The learned model may perform matching between CAD data prestored in a storage device (not illustrated) and the image acquired by the cargo sensor 110 to enable estimating a contour shape of the cargo 15 based on the dimensions of the CAD data having the highest matching degree. The cargo sensor 110, for example, as a line sensor for linearly sensing the distance from the sensor to a target object, may measure the shape of the cargo 15. In the shape measurement for the cargo 15, the cargo sensor 110 may scan the line according to the movement of the cargo 15, for example, at a timing when the cargo 15 is loaded on the vehicle. Then, the learned model obtains a three-dimensional point group of the cargo 15 to estimate a contour shape. As described above, as long as information about the shape of the cargo 15 is acquired, there is no limitation on the sensor to be used, i.e., any types of sensors may be used, as the cargo sensor 110.

The environmental sensor 120 is a measurement apparatus for measuring the surrounding environment where the vehicle is running. According to the present exemplary embodiment, the environmental sensor 120 is a depth camera. The environmental sensor 120 outputs a depth map as observations on the surrounding environment of the vehicle. The depth map in this case refers to an image holding values correlated with the distance to the measurement target (depth) for each pixel of the image acquired by the environmental sensor 120. Normally, a value correlated with the distance to the measurement target is an integer value which can be configured as a normal image. This value, when multiplied by a predetermined coefficient determined based on the focal length, can be converted into a physical distance (for example, in millimeters) to the measurement target. There is no particular restriction on the method for measuring the distance for generating a depth map. Examples of methods for measuring the distance include an active stereo method for capturing an image of a multi-slit line radiated onto a measurement target with a camera and performing distance measurement through triangulation, a ToF method using the flight time of light, such as Light Detection and Ranging (LiDAR), and a passive method for calculating the depth of each pixel based on an image captured by a stereo camera, through triangulation. According to the present exemplary embodiment, the environmental sensor 120 is a ToF-based depth camera. The environmental sensor 120 sends the measured depth map to the environmental image input unit 1130.

The actuator unit 130 drives the wheels based on the control values (for example, movement control information about the rotational torque of the wheels and the traveling direction) determined by the determination unit 1160. The movement control according to the present exemplary embodiment refers to controlling a motor as an actuator in the vehicle and the steering for changing the orientation of the wheels. Controlling these devices enables moving the vehicle to a predetermined destination. The control values are instruction values for controlling the vehicle, more specifically, the traveling direction, acceleration, and rotational speed of the wheels of the vehicle. In this case, the vehicle loaded with the cargo 15 runs on an optimal path (for example, shortest path) toward the destination, based on the control values.

The position and orientations of the environmental sensor 120 according to the present exemplary embodiment refer to six parameters including three parameters indicating the position of the environmental sensor 120 in a world coordinate system defined in real space, and three parameters indicating the orientation of the environmental sensor 120. In this case, the world coordinate system is defined as a coordinate system including two axes for defining a floor, and one axis vertically intersecting with the two axes and representing the height direction. The attachment position of the environmental sensor 120 with respect to the barycentric position of the vehicle is measured in the design phase of the vehicle such as an AGV. A matrix representing the above-described attachment position and orientation is stored in an external memory H14. The barycentric position of the vehicle can be acquired by multiplying the position and orientation of the environmental sensor 120 by the above-described matrix representing the attachment position and orientation. More specifically, the position and orientation of the vehicle system 12 in the world coordinate system can be easily acquired by acquiring the position and orientation of the environmental sensor 120 in the world coordinate system. A three-dimensional coordinate system defined on an imaging apparatus, having the optical axis of the cargo sensor 110 as the Z axis, the horizontal direction of the image as the X axis, and the vertical direction of the image as the Y axis, is referred to as a first coordinate system. Likewise, a three-dimensional coordinate system defined on the imaging apparatus, having the optical axis of the environmental sensor 120 as the Z axis, the horizontal direction of the image as the X axis, and the vertical direction of the image as the Y axis, is referred to as a second coordinate system. Likewise, a three-dimensional coordinate system defined on the vehicle system 12, having the traveling direction of the vehicle system 12 as the X axis, the height direction thereof as the Z axis, and the axis perpendicularly intersecting with the X and Z axes as the Y axis, is referred to as a third coordinate system.

The cargo image input unit (first input unit) 1110 inputs a depth map in a time-sequential way (for example, 60 frames per second) as visual information acquired by the cargo sensor 110. The depth map stores the depth value for each pixel of a scene image of the observed cargo 15. Then, the cargo image input unit 1110 outputs the depth map to the cargo information acquisition unit 1120. The depth value refers to the distance between the cargo sensor 110 and the cargo 15 conveyed by the AGV.

The cargo information acquisition unit (first acquisition unit) 1120 acquires information (first information) about the three-dimensional shape of the cargo 15 based on the depth map input by the cargo image input unit 1110. According to the present exemplary embodiment, the contour shape represented by the three-dimensional bounding box of the cargo 15 (three parameters indicating the barycentric position and three parameters indicating the size of the bounding box) is estimated as information about the shape of the cargo 15. More specifically, the height of the vehicle loaded with the cargo 15, and the size of the portion of the cargo 15 protruded from the vehicle in the width direction are indicated. The cargo information acquisition unit 1120 further outputs the acquired cargo shape to the determination unit 1160.

The environmental image input unit (second input unit) 1130 inputs a depth map from the environmental sensor 120 in a time-sequential way (for example, 60 frames per second). The depth map stores the depth value for each pixel of a captured scene image of the environment where the vehicle moves. Then, the environmental image input unit 1130 outputs the depth map to the position and orientation information acquisition unit 1140. The depth value refers to the distance between the environmental sensor 120 and an object (for example, a wall and an obstacle) in the surrounding environment.

The position and orientation information acquisition unit (second acquisition unit) 1140 stores a position and orientation estimation map used as an index for position and orientation acquisition, and acquires information (second information) about the position and orientation of the cargo sensor 110 by using the depth map input by the environmental image input unit 1130 and the position and orientation estimation map. In this case, the position and orientation estimation map is three-dimensional point group data representing the environmental shape. According to the present exemplary embodiment, it is assumed that the position and orientation information acquisition unit 1140 stores a point cloud as a data list storing the three values of the three-dimensional coordinates (X, Y, Z) in an arbitrary world coordinate system. A position and orientation estimation map is generated in advance by converting a CAD model of the environment into a three-dimensional point group indicating the depth of the object surface. Control map information (described below) may be used as a position and orientation estimation map. The position and orientation information acquisition unit 1140 further outputs the acquired position and orientation to the determination unit 1160. The positional relation between the environmental sensor 120 and the vehicle is pre-calibrated. Therefore, if the position and orientation of the environmental sensor 120 are known, the position and traveling direction of the vehicle are given.

The storage unit 1150 stores an occupancy map as control map information. An occupancy map refers to a map in which a scene is divided in a lattice form, and the obstacle existence probability for each lattice is stored. The occupancy map is stored as a three-dimensional voxel space (X, Y, Z) in the world coordinate system or a two-dimensional grid space (X, Y) excluding information about the height direction. According to the present exemplary embodiment, the occupancy map is stored as information in a three-dimensional voxel space. Like the position and orientation estimation map, the occupancy map is also generated by converting a CAD model of the environment. In addition to the occupancy map, the storage unit 1150 stores target position and orientation information representing three-dimensional coordinates as a destination of the AGV and the orientation. There may be one or a plurality of target positions and orientations. However, for simplicity, an example case of the target position and orientation for one point will be described below. The storage unit 1150 further stores information about the contour shape of the vehicle including the height, width, and depth of the vehicle. Since the contour shape of the cargo 15 may change as a result of loading and unloading the cargo 15, the storage unit 1150 stores the information in a state where the cargo 15 is not loaded as an initial value. The information about the cargo 15 is acquired with a method (described below) at a timing when the vehicle system 12 starts a task in which the vehicle conveys the cargo 15. If necessary, the storage unit 1150 outputs map information acquired from the position and orientation estimation map or the occupancy map to the determination unit 1160. The storage unit 1150 further outputs the target position and orientation to the determination unit 1160.

The determination unit 1160 determines the control values such that the vehicle and the cargo 15 move while maintaining a fixed distance or longer from the environment (obstacle), based on the three-dimensional shape of the cargo 15 acquired by the cargo information acquisition unit 1120. If necessary, the determination unit 1160 utilizes the position and orientation of the environmental sensor 120 acquired by the position and orientation information acquisition unit 1140, and the control map information and the information about the target position and orientation stored in the storage unit 1150. The determination unit 1160 outputs the determined control values to the actuator unit 130.

Figure 4:
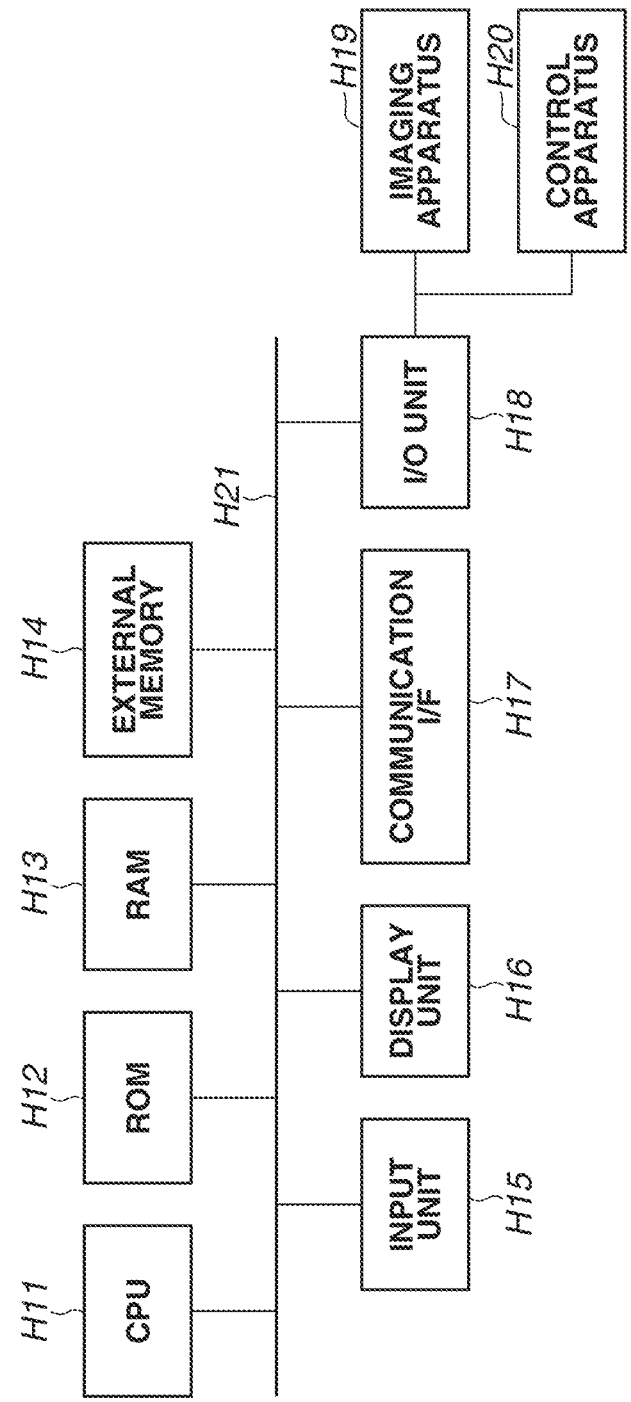
FIG. 4 illustrates an example of a hardware configuration of an information processing apparatus.

FIG. 4 illustrates a hardware configuration of the information processing apparatus 10. A central processing unit (CPU) H11 controls various devices connected to a system bus H21. A read only memory (ROM) H12 stores programs of the basic input/output system (BIOS) and the boot program. A random access memory (RAM) H13 is used as the main memory unit of the CPU H11. An external memory H14 stores programs to be processed by the information processing apparatus 10. An input unit H15 including a keyboard, mouse, and robot controller performs processing related to information input. A display unit H16 outputs calculation results of the information processing apparatus 10 to a display apparatus according to an instruction from the CPU H11. The display apparatus is a liquid crystal display apparatus, projector, light emitting diode (LED) indicator, and any other types of display. The display unit H16 of the information processing apparatus 10 may serve as a display apparatus. A communication interface H17 performs information communication through a network, and may be the Ethernet (registered trademark), a universal serial bus (USB), serial communication interface, a wireless communication interface, and any other types of communication interfaces. The communication interface H17 exchanges information with the vehicle management system 13 described above via the communication interface H17. An input/output unit H18 inputs visual information from an imaging apparatus H19. The imaging apparatus H19 refers to the cargo sensor 110 or the environmental sensor 120 described above. A control apparatus H20 refers to the actuator unit 130 described above.

Processing according to the present exemplary embodiment will be described below. FIG. 5 is a flowchart illustrating processing performed by the information processing apparatus 10 according to the present exemplary embodiment. The flowchart is implemented when the CPU H11 executes a control program. The flowchart includes processing steps S110, S120, S130, S140, S150, S160, and S170.

In step S110, the information processing apparatus 10 initializes the system. More specifically, the CPU H11 reads a program from the external memory H14 and sets the information processing apparatus 10 to an operative state. The CPU H11 also reads parameters of each apparatus connected to the information processing apparatus 10 (camera internal and external parameters of the cargo sensor 110 and the environmental sensor 120) and the initial position and orientation of the cargo sensor 110 into a RAM H13. Then, the CPU H11 activates each device of the AGV to set the AGV to a controllable state. In addition, the CPU H11 receives the three-dimensional coordinates of the destination of the AGV from the vehicle management system 13 via the communication interface (I/F) H17 and stores the three-dimensional coordinates in the storage unit 1150.

In step S120, the cargo image input unit 1110 inputs a depth map as an image of the cargo 15 captured by the cargo sensor 110. More specifically, the cargo image input unit 1110 inputs a depth map of a scene image of the cargo 15 captured by the depth camera. According to the present exemplary embodiment, a depth map refers to a two-dimensional arrangement list storing the depth value of each pixel.

In step S130, the cargo information acquisition unit 1120 acquires information (first information) for identifying the three-dimensional shape of the cargo 15, by using the depth map (first image) input by the cargo image input unit 1110. According to the present exemplary embodiment, the information for identifying the three-dimensional shape of the cargo 15 refers to the contour shape and also the six parameters (three positional parameters and three size parameters) representing a three-dimensional bounding box. More specifically, the cargo information acquisition unit 1120 acquires an Axis-Aligned Bounding Box (AABB) including the height, width, depth, and barycentric position of the cargo 15 in the vehicle coordinate system.

More specifically, in acquisition of the contour shape of the cargo 15, the cargo information acquisition unit 1120 first acquires a three-dimensional point group defined in the first coordinate system from the depth map. The cargo information acquisition unit 1120 acquires a three-dimensional point group by multiplying the image coordinates in the normalized image coordinate system by the depth value of each pixel in the depth map. Then, the cargo information acquisition unit 1120 converts the coordinate system of the acquired three-dimensional point group from a cargo imaging coordinate system to a vehicle coordinate system. Further, the cargo information acquisition unit 1120 removes planes from the three-dimensional point group by using the RANdom SAmple Consensus (RANSAC) algorithm to separate three-dimensional points as cargo candidates from the three-dimensional point group as the background of the floor. At the end, based on the three-dimensional point group of cargo candidates, the cargo information acquisition unit 1120 acquires the minimum and maximum values for each axis of the three-dimensional point group to acquire the height, width, depth, and barycentric position (AABB) of the cargo 15 in the vehicle coordinate system, as a contour shape of the cargo 15. At the end, the cargo information acquisition unit 1120 outputs the value of the acquired contour shape to the determination unit 1160.

In step S140, the environmental image input unit 1130 acquires a depth map as observations of the surrounding environment of the vehicle. This depth map is acquired by the environmental sensor 120. According to the present exemplary embodiment, a depth map refers to a two-dimensional arrangement list storing the depth value of each pixel.

In step S150, the position and orientation information acquisition unit 1140 acquires the position and orientation (second information) of the environmental sensor 120 by using the depth map input by the environmental image input unit 1130 and the position and orientation estimation map. More specifically, the position and orientation information acquisition unit 1140 acquires the three-dimensional point group defined in the second coordinate system from the depth map. The position and orientation information acquisition unit 1140 acquires a three-dimensional point group by multiplying the image coordinates in the normalized image coordinate system by the depth value of each pixel in the depth map. Then, the position and orientation information acquisition unit 1140 converts the three-dimensional point group into that in the position and orientation coordinate system at the previous time by using the position and orientation of the environmental sensor 120 at the previous time. More specifically, the three-dimensional point group is multiplied by the matrix of the position and orientation at the previous time. The position and orientation information acquisition unit 1140 acquires the position and orientation so as to minimize the sum of the distances between the nearest three-dimensional points in the acquired three-dimensional point group and the point cloud of the map information stored in the storage unit 1150. More specifically, the position and orientation information acquisition unit 1140 acquires the position and orientation of the environmental sensor 120 with respect to the position and orientation at the previous time by using the Iterative Closest Point (ICP) algorithm. At the end, the position and orientation information acquisition unit 1140 converts the position and orientation into that in the world coordinate system and outputs the position and orientation in the world coordinate system to the determination unit 1160. The distance between the surrounding environment and the vehicle can be acquired by obtaining the position and orientation of the vehicle in this way.

In step S160, based on the three-dimensional information (second information) about the environment where the vehicle moves and information (first information) for identifying the height of the cargo 15, the determination unit 1160 determines the control values for preventing the cargo 15 and an obstacle from coming closer to each other than a predetermined distance. More specifically, the determination unit 1160 determines such control values that the vehicle loaded with the cargo 15 moves on a moving path having a sufficient height for the vehicle to pass. An example is illustrated in FIGS. 6A and 6B. Referring to FIG. 6A, a vehicle E12a is executing a task for conveying a cargo to a destination E16a. First of all, the determination unit 1160 extracts an occupancy map E11 in terms of the height of the vehicle E12a including the cargo to obtain a three-dimensional occupancy map E13a. Then, the determination unit 1160 projects the occupancy map E13a to the flat floor surface to obtain a two-dimensional occupancy map E14a. On the two-dimensional occupancy map E14a, the determination unit 1160 calculates an optimal path E17a for the movement from the vehicle's position and orientation E15a to the destination's position and orientation E16a. For example, when the vehicle E12a advances straight ahead, the cargo of the vehicle E12a will contact the environment (for example, an obstacle X illustrated in FIG. 6A) possibly collapsing the cargo. To avoid selecting the moving path, the determination unit 1160 determines the control values for passing along the moving path E17a which does not pass the region where the obstacle exists. FIG. 6B illustrates another case where the cargo is different in height. A three-dimensional occupancy map E13b is extracted in terms of the height of a vehicle E12b. The obstacle X is not displayed on a two-dimensional occupancy map E14b projected in terms of the height of the occupancy map E13b. In different occupancy maps, path and control values to be calculated are also different. More specifically, when the vehicle E12b conveys a smaller amount of cargo than the vehicle E12a, the moving path in front of the vehicle E12b (path where the obstacle X exists) is passable, and therefore the vehicle E12b passes along a moving path E17b to advance to a destination E16b.

Processing in step S160 will be described below. First of all, based on the contour shape (AABB) of the cargo in the vehicle coordinate system estimated by the position and orientation information acquisition unit 1140 and the contour shape (AABB) of the AGV in the vehicle coordinate system, the determination unit 1160 acquires the contour shape of the height, width, and depth of the entire vehicle including these contour shapes. The determination unit 1160 acquires the contour shape of the entire vehicle by taking the minimum and maximum values of the height, width, and depth. Then, the determination unit 1160 extracts a partial map of the range where the vehicle can contact an obstacle, from the three-dimensional grid occupancy map stored in the storage unit 1150. More specifically, in a case where the barycentric position of the entire vehicle is (Xw, Yw, Zw) and the size of the three-dimensional (3D) bounding box is (Sx, Sy, Sz) in the occupancy map, the determination unit 1160 slices the occupancy map in a range of Zw±Sz/2 in the height direction from the floor. A map extracted in this way is acquired as a partial occupancy map. Then, the determination unit 1160 projects the partial occupancy map in the height direction (z direction) from the floor to obtain a two-dimensional grid occupancy map. Projection in the height direction refers to an operation for scanning an occupancy lattice (x, y, z) in the z direction to obtain the maximum value of the obstacle existence probability at each (x, y). Likewise, the determination unit 1160 projects the target and the current positions and orientations of the vehicle system 12 represented as three-dimensional positions and orientations in the world coordinate system onto a two-dimensional plane to obtain parameters having a total of three degrees of freedom (two degrees of freedom of position plus one degree of freedom of orientation). In this case, the two degrees of freedom of position refer to the positions X and Y on a plane horizontal to the floor of the environment, and the one degree of freedom of orientation refers to the rotational direction on a plane horizontal to the floor of the environment. At the end, based on information about the two-dimensional grid occupancy map and the target and the current positions and orientations, the determination unit 1160 determines the control values for avoiding a lattice having a high obstacle existence probability while minimizing these positions and orientations. More specifically, based on the current position and orientation of the input vehicle and the input target position and orientation, the determination unit 1160 calculates all of possible variations of the control values (forward speed, turning direction, and turning speed) for minimizing the Euclidean distance between the two different positions and orientations, as control value candidates. With respect to each of the control value candidates, the determination unit 1160 calculates the position and orientation after control as the prediction position and orientation. The determination unit 1160 obtains the obstacle existence probability corresponding to each prediction position and orientation, referring to the two-dimensional grid occupancy map. The determination unit 1160 calculates control value candidates having a zero obstacle existence probability, to extract control value candidates with which no collision occurs. The determination unit 1160 determines the control values for minimizing the Euclidean distance between the target and the prediction positions and orientations, from among the extracted control value candidates, as final control values. Then, the determination unit 1160 outputs the determined control values to the actuator unit 130. Then, the actuator unit 130 controls the AGV by using the control values determined by the determination unit 1160. More specifically, the actuator unit 130 adjusts the amount of rotations of the motor as an actuator and the angle value of the steering for changing the orientation of the wheels such that the control values (forward speed, turning direction, and turning speed) determined by the determination unit 1160 are obtained.

In step S170, the determination unit 1160 determines whether to end the system. More specifically, when the Euclidean distance between the destination coordinates stored in the storage unit 1150 and the position and orientation from the environmental sensor 120 acquired by the position and orientation information acquisition unit 1140 is equal to or less than a predetermined threshold value (for example, 1 m), the determination unit 1160 determines that the vehicle has reached the destination (YES in step S170), and the determination unit 1160 ends the system. On the other hand, when the Euclidean distance exceeds the predetermined threshold value (NO in step S170), the processing returns to step S140. Then, the information processing apparatus 10 continues the processing.

According to the first exemplary embodiment, the cargo sensor 110 acquires the three-dimensional contour shape of the cargo. Then, the information processing apparatus 10 acquires the contour shape of the entire vehicle including the cargo, acquires a moving path along which the vehicle including the cargo does not contact an obstacle in the environment, and performs movement control on the vehicle. This makes it possible to perform stable and safe control in which the cargo does not collide with an obstacle in the environment, based on the size of the cargo to be conveyed (the height of the cargo and a portion of the cargo protruding from the vehicle). Also, in a case where the cargo is different in size for each conveyance, it is possible to perform movement control on the vehicle system 12 without presetting the size of the cargo, i.e., with reduced time and effort.

(Modification 1-1)

Although, in the present exemplary embodiment, the cargo 15 is imaged by the cargo sensor 110, the present disclosure is not limited thereto. For example, instead of the cargo sensor 110, the environmental sensor 120 may be used to image the cargo 15. In this case, the environmental sensor 120 and the cargo sensor 110 may be an identical apparatus. For example, a wide-area camera serving as both the cargo sensor 110 and the environmental sensor 120 is mounted on the vehicle. A monitoring camera installed in the environment to image a vehicle may be replaced with a wide-angle camera or a panorama camera to capture the environment and the vehicle loaded with a cargo at the same time. The cargo sensor 110 images not only the environment but also the cargo to enable performing movement control on the vehicle based on the shape, position, and type of the cargo by using fewer imaging apparatuses. Cargo images may be captured by using a plurality of sensors in an associated way. For example, images are acquired from a depth camera mounted on the vehicle and at least one wide-area camera installed in the environment. Using a plurality of sensors reduces dead angles, making it possible to correctly estimate the information about the cargo.

(Modification 1-2)

Although the present exemplary embodiment premises that the cargo sensor 110 is attached to the vehicle system 12, the present disclosure is not limited thereto. For example, a monitoring camera installed at a place where the vehicle and the cargo can be observed and capable of communicating with the process management system 14 or the vehicle system 12 may be used as the cargo sensor 110. In this case, the monitoring camera is a red, green, and blue (RGB) color camera for monitoring the status of an operating environment such as a factory or a distribution warehouse. The storage unit in the process management system 14 or the vehicle system 12 stores the position and orientation of the monitoring camera in the world coordinate system of the environment. The monitoring camera as the cargo sensor 110 observes the shape, position, and orientation of the cargo 15. Using the position and orientation of the monitoring camera in the world coordinate system, and the position and orientation of the environmental sensor 120, the information obtained by observation is converted into information about the shape and position of the cargo 15 in the vehicle coordinate system and then input to the determination unit 1160. An external camera used as the cargo sensor 110 is not limited to a monitoring camera. For example, the cargo sensor 110 may be a camera installed on the side of an automated machine for loading a cargo on the vehicle. Instead of a camera, the cargo sensor 110 may also be a two-dimensional distance sensor such as a line sensor. In addition to the camera installed in the environment, the cargo sensor 110 may also be a camera mounted on another AGV or a camera held by the user. There is no particular restriction on the sensor used as the cargo sensor 110 as long as the sensor is capable of measuring the cargo 15 and acquiring information about the cargo 15 on the vehicle system 12.

(Modification 1-3)

Although, in the present exemplary embodiment, the cargo information acquisition unit 1120 acquires the value of the three-dimensional bounding box as a three-dimensional contour shape of the cargo 15, the present disclosure is not limited thereto. For example, the three-dimensional point group of cargo candidates in the depth map may be stored as a shape, or a mesh generated from the three-dimensional point group may be handled as a three-dimensional polygon model. Alternatively, the shape of the cargo is stored by using a method, such the Truncated Signed Distance Function (TSDF) volume, in which the singed distance to the nearest neighbor three-dimensional surface is stored for each voxel. Alternatively, the shape is represented in the form of an occupancy map in which the object existence probability is stored in voxels. There is no particular restriction on the method for estimating and expressing the shape of the cargo. Likewise, the method for storing and representing the shape of the vehicle stored in the determination unit 1160 is not limited to that using a contour shape like a bounding box. A detailed shape may be stored by using the above-described method. There is no restriction on shape information about the cargo acquired by the position and orientation information acquisition unit 1140. Any form of shape information can be used as long as the shape information can express the shape and size of the cargo 15.

(Modification 1-4)

Although, in the present exemplary embodiment, the cargo information acquisition unit 1120 determines the three-dimensional point group of cargo candidates based on the segmentation of planar portions and cargo candidate portions, the present disclosure is not limited thereto. For example, suppose a case where the overall positional relation between the cargo 15 loaded on or pulled by the vehicle system 12 and the cargo sensor 110 is known. In this case, processing may be performed on the premise that a range where the cargo 15 exists is given as a 3D Region of Interest (ROI) in the depth map. In this case, instead of performing the segmentation on planar portions, the cargo information acquisition unit 1120 extracts the three-dimensional point group within a 3D ROI as a three-dimensional point group of cargo candidates by using the 3D ROI representing the range where the cargo 15 exists. Alternatively, if the shape of a part of the cargo is known, like a cargo of stacked boxes, the shape and position of the entire cargo 15 may be obtained through three-dimensional object detection based on template matching or feature point matching.

(Modification 1-5)

According to the present exemplary embodiment, a control map is not limited to a preset occupancy map. For example, the occupancy map may be dynamically updated by calculating regions where an obstacle exists and regions where no obstacle exists based on the depth map acquired from the environmental sensor 120 and information about the position and orientation estimated by the position and orientation information acquisition unit 1140. An occupancy map is generated from zero without prior information. Alternatively, an occupancy map may be acquired by updating a prestored occupancy map. There is no particular restriction on the method for generating and updating an occupancy map as long as the method can express information about obstacles in the surrounding environment. By dynamically updating the occupancy map, the vehicle can be controlled in consideration of obstacles not included in a pre-generated occupancy map, such as a new baggage placed in the environment.

(Modification 1-6)

The present exemplary embodiment has been described above based on a method for using a three-dimensional occupancy map as a control map and a method for estimating position and orientation parameters having six degrees of freedom as the position and orientation information for the environmental sensor 120, the present disclosure is not limited thereto. For example, a two-dimensional occupancy map without information about the height direction is applicable. Alternatively, two-dimensional point group data (combined with color information) on a plane horizontal to the floor of the environment, or a two-dimensional model on a plane horizontal to the floor of the environment are used as the control map. The position and orientation information may be position and orientation parameters having a total of three degrees of freedom of the vehicle system 12, i.e., two degrees of freedom of position plus one degree of freedom of orientation, in the world coordinate system of the environment. In this case, the two degrees of freedom of position refer to positions X and Y on a plane horizontal to the floor of the environment, and the one degree of freedom of orientation refers to the rotational direction on a plane horizontal to the floor of the environment. There is no restriction on the method for storing and expressing a control map. Any method can be used as long as the method can store information about obstacles in the surrounding environment in a form usable by the determination unit 1160.

(Modification 1-7)

Although, in the present exemplary embodiment, the position and orientation information acquisition unit 1140 acquires the position and orientation of the environmental sensor 120 based on the ICP algorithm using a three-dimensional point group representing a scene in the environment and a depth map, the method for acquiring the position and orientation is not limited thereto. For example, a position and orientation estimation map is not pre-generated but generated by moving the vehicle system 12 within the environment. More specifically, three-dimensional point group data is generated by integrating a depth map acquired from the environmental sensor 120 mounted on the vehicle system 12 in terms of a plurality of viewpoints while operating the vehicle system 12 with a remote control or by pushing by hand. As a position and orientation estimation map, a computer-aided design (CAD) drawing or a map image of the environment may be used as it is or after data format conversion. The position and orientation estimation map generated in this way may be used to acquire the position and orientation. As the environmental sensor 120, an imaging apparatus for capturing a scene image in the environment as a color or grayscale image may be used instead of a depth sensor. In this case, an image to be captured may be a color or grayscale image. In this case, a feature point map including three-dimensional feature points is generated based on an input color or grayscale image. Then, feature points in an image input to the environmental image input unit 1130 are associated with feature points in the feature point map to acquire the position and orientation. Many Simultaneous Localization and Mapping (SLAM) techniques for performing position and orientation estimation while creating map information have been proposed. These techniques may be used to perform the above-described processing. In addition, when the position and orientation information acquisition unit 1140 estimates position and orientation information, a Wi-Fi communication status and a beacon installed in the environment may be used together. There is no particular restriction on the acquisition method used by the position and orientation information acquisition unit 1140. Any acquisition method can be used as long as the method can acquire the position and orientation of the vehicle 12 in the world coordinate system.

(Modification 1-8)

The present exemplary embodiment has been described above centering on a method for acquiring the shape of an object. Cargo information estimated by the cargo information acquisition unit 1120 is not limited to the shape. For example, the cargo information acquisition unit 1120 may acquire such semantic information as the type and state of an object, and the determination unit 1160 may determine the control values based on the information. More specifically, for example, glass, liquid, and other fragile materials and cargo types not to be inconveniently shaken are predetermined. Based on a color image including the cargo 15 imaged by the cargo sensor 110, the cargo type is estimated by estimating a semantic class of the cargo candidate region through semantic segmentation for determining the object type for each pixel. If the estimated object type is included in the predetermined fragile cargo types, the maximum speed as a control value in the determination unit 1160 is limited. For example, when the cargo is estimated to be made of glass, the information processing apparatus 10 performs movement control with as small amount of vibration as possible. By performing speed control depending on the cargo type, it becomes possible to perform movement control on the vehicle such that the cargo is not easily shaken or collapsed.

(Modification 1-9)

Although, in the present exemplary embodiment, the shape is measured as cargo information based on the depth map for a captured image of the cargo input to the cargo image input unit 1110, the present disclosure is not limited thereto. For example, the cargo information may be acquired by using an identification (ID) tag applied to the cargo. More specifically, for example, the cargo is applied with an ID tag storing information about the shape and type of the cargo 15 or information associated with them. Alternatively, the cargo information acquisition unit 1120 recognizes the ID tag from images captured by the cargo sensor 110 or the environmental sensor 120 to acquire information about the shape and type of the cargo 15. In addition, the method for acquiring cargo information is not limited to a method using an image. For example, the process management system 14 or the vehicle management system 13 manages the shape, type, and position of each cargo. In step S110, the cargo image input unit 1110 receives information about the cargo to be loaded at the timing when the target position and orientation are received. The information about the shape and type of the cargo 15 may be acquired in this way. In this case, the cargo sensor 110 does not need to be connected to the cargo image input unit 1110. Even if the cargo sensor 110 is absent, no particular problem occurs.

(Modification 1-10)

According to the present exemplary embodiment, the vehicle system 12 is applicable to various forms of AGVs. Examples of forms of AGVs include a vehicle for conveying a cargo by being pushed under the cargo, and an AGV having vertically and horizontally movable wheels. In this case, the determination unit 1160 calculates not only the control values for back-and-forth movement but also the control values for lateral movement to determine optimal control values. Examples of forms of AGVs also include a traction type AGV. In this case, control values in consideration of the movements of the cargo to be pulled and joints with the dolly are obtained. Since a traction type AGV is subjected to a lateral shake, the method for determining the control values may be changed depending on the form of the vehicle, for example, such that the AGV passes along a sufficiently wide path. In addition, the vehicle systems 12 may be an automated operation vehicle or an autonomous mobile robot. The information processing apparatus 10 according to the present exemplary embodiment may be applied to these apparatuses. The present exemplary embodiment may be applied to an automated conveyance forklift having a fork movable portion. The present exemplary embodiment may be applied to flying vehicles such as drones.

(Modification 1-11)

Although, in the present exemplary embodiment, the determination unit 1160 determines the control values in consideration of contact between the vehicle including the cargo 15 and an obstacle based on the contour shape of the cargo 15 estimated by the cargo information acquisition unit 1120, the present disclosure is not limited thereto. For example, the determination unit 1160 may communicate with the vehicle management system 13 and the process management system 14 to perform system operation so as to use a vehicle having a shape which does not cause contact between the cargo 15 and an obstacle in the surrounding environment. More specifically, the vehicle management system 13 stores information about the contour shape of each of a plurality of vehicle systems. The determination unit 1160 acquires a plurality of two-dimensional occupancy lattices corresponding to the contour shapes of the plurality of the vehicle systems. Then, the determination unit 1160 determines a vehicle system having a shape enabling the conveyance in the shortest path. Then, the determination unit 1160 communicates with the vehicle management system 13 so that the determined vehicle conveys the cargo. By selectively operating a plurality of vehicles having different shapes according to the shape of the cargo, instead of controlling only one vehicle, it becomes possible to perform operation control to achieve optimal operations of the entire system.

(Modification 1-12)

The following describes a method performed by the determination unit 1160 to determine the control values of the vehicle by using a partial map for three-dimensional control as a result of extracting a range where the vehicle contacts an obstacle, without two-dimensionally projecting the three-dimensional control map. In step S160 illustrated in FIG. 5, the determination unit 1160 determines the control values for controlling the AGV. More specifically, based on the destination coordinates defined on the occupancy map and the position and orientation of the vehicle on the occupancy map, the determination unit 1160 determines the control values for avoiding lattices having a high obstacle existence probability on the occupancy map and minimizing the Euclidean distance between the destination coordinates and the position and orientation of the vehicle.

First of all, the determination unit 1160 acquires the contour shape of the entire vehicle based on the contour shape (AABB) of the cargo in the vehicle coordinate system estimated by the cargo information acquisition unit 1120. Then, like the first exemplary embodiment, the determination unit 1160 extracts as a partial occupancy map an occupancy map of the portion of the range where the vehicle can contact an obstacle, from the three-dimensional occupancy map stored in the storage unit 1150. Then, based on the current position and orientation of the vehicle and the input target position and orientation, the determination unit 1160 acquires all of possible variations of the control values (forward speed, turning direction, and turning speed) for minimizing the Euclidean distance between the two different positions and orientations, as control value candidates. With respect to each control value candidate, the determination unit 1160 acquires the prediction position and orientation after control. Then, the determination unit 1160 determines the collision of the vehicle in the prediction position and orientation with the partial occupancy map. More specifically, when determining the collision, the determination unit 1160 scans the partial occupancy map in the range of the contour shape of the vehicle in the prediction position and orientation. When there is an occupancy lattice having an obstacle existence probability higher than a predetermined value, the determination unit 1160 determines the danger of collision and cancels the control value candidates regarding which the prediction position and orientation were acquired. From among the control value candidates that are not canceled, the determination unit 1160 determines the control values for minimizing the Euclidean distance between the target and the prediction positions and orientations as final control values. Then, the determination unit 1160 outputs the determined control values to the actuator unit 130. Then, the actuator unit 130 controls the AGV by using the control values determined by the determination unit 1160. This makes it possible to perform stable and safe control in which the cargo does not collide with an obstacle in the environment depending on the size of the cargo to be conveyed. Also, in a case where the cargo is different in size for each conveyance, it is possible to perform movement control on the vehicle system 12 without presetting the size of the cargo, i.e., with reduced time and effort.

(Modification 1-13)

Although the storage unit 1150 stores an occupancy map as a control map and determines an optimal path based on the occupancy map, and the determination unit 1160 determines the control values of the vehicle, the present disclosure is not limited thereto. As long as the determination unit 1160 determines the control values for enabling the vehicle to reach the destination so that the vehicle does not contact an obstacle in the environment, the determination unit 1160 may determine any types of control values. For example, the determination unit 1160 may store a plurality of depth maps as key frames, and store a control map as a set of key frames. In this case, while performing movement control for minimizing the Euclidean distance between the target and the current positions and orientations, the determination unit 1160 calculates, for example, the closest distance between the depth map in the closest key frame of the current position and orientation and the contour shape of the entire vehicle. When the distance is equal to or less than a predetermined value, the determination unit 1160 performs control to stop moving and turn the vehicle. When the threshold value for determining an obstacle exceeds 0, for example, the determination unit 1160 determines that an obstacle exists. the present disclosure is not necessarily limited to store depth maps as key frames. The determination unit 1160 may calculate the closest distance between the depth map input to the environmental image input unit 1130 and the contour shape of the entire vehicle to control the vehicle.

As a control map, the determination unit 1160 may calculate the control values for avoiding an obstacle based on Euclidean Signed Distance Fields (ESDFs) storing the signed distance to the closest obstacle and perform movement control. As a control map, the determination unit 1160 stores a cost map storing values which decrease with decreasing distance to the destination. The determination unit 1160 may determine the control values by using a deep reinforcement learning machine as a neural network having learned to determine the control values by inputting the cost map and the input depth map. By calculating contacts between the shape of the entire vehicle including the cargo and obstacles such as walls and determining the control values for avoiding contacts, the AGV can be operated in a stable and safe way.

(Modification 1-14)

According to the present exemplary embodiment, the determination unit 1160 uses Dynamic Window Approach for calculating, based on the current position and orientation of the vehicle and the input target position and orientation, all of possible variations of the control values for minimizing the Euclidean distance between the two different positions and orientations at a certain time, as control value candidates. However, the method for calculating the control values is not limited thereto as long as a moving path of the AGV can be set while avoiding regions having a high probability of collision with an obstacle. For example, the determination unit 1160 may use Graph Search Approach as a technique for calculating variations of the control values at a plurality of future times, calculating the position and orientation (prediction path) at the plurality of times, and selecting the control values for tracking the prediction path. In this case, the determination unit 1160 selects a prediction path passing through only regions having a zero obstacle existence probability in the two-dimensional grid occupancy map, and calculates the control values for tracking this prediction path at a plurality of times. When selecting a prediction path, the determination unit 1160 may select a prediction path where the moving path is minimized, a prediction path where the distance to a region having a non-zero obstacle existence probability in the occupancy map is maximized, or a prediction path where the change of turning is minimized. In addition, any other techniques such as Randomized Approach are also applicable. This technique samples at random a fixed region without obstacle from the two-dimensional space at the current position, repetitively samples at random a surrounding space by using the current position as a node to generate a prediction path, and select the generated prediction path.

Although, in the present exemplary embodiment, the occupancy map in a range $Zw\pm Sz/2$ is sliced to acquire a partial occupancy map, the occupancy map in a range $Zw-Sz/2<Z<Zw+Sz/2+\Delta m$ ($\Delta m$ is a margin) may be sliced. Performing processing in this way enables the AGV to move away from obstacles by a distance equal to or larger than a predetermined margin, thus achieving safe AGV operations.

The predetermined value $\Delta m$ may be preset by the user or changed depending on the traveling speed of the vehicle. For example, the user makes setting such that, in consideration of factory regulations, the AGV runs $\Delta m=1$ m away from a position where the object existence probability in the occupancy map exceeds 0. By providing a margin to the distance between an obstacle or surrounding environment and the cargo in this way, the cargo can be stably conveyed even if the cargo slightly slides. When setting a predetermined value $\Delta m$ depending on the traveling speed of the vehicle, the determination unit 1160 determines the predetermined value $\Delta m$ such that the traveling speed becomes proportional to the predetermined value. More specifically, when the vehicle runs at 1 m/s, $\Delta m$ is set to 1 m. When the vehicle runs at 2 m/s, $\Delta m$ is set to 2 m.

It is also possible that the position and orientation information acquisition unit 1140 acquires a variance value as a value of the variation degree of the position and orientation at the time of position and orientation calculation, and that the determination unit 1160 sets $\Delta m$ based on the acquired variance value. For example, the determination unit 1160 determines the predetermined value $\Delta m$ so as to be proportional to the variance value. In addition, the determination unit 1160 may measure variation in vehicle control in advance, and determine the predetermined value $\Delta m$ so as to be proportional to the variation. Variation in vehicle control refers to the variation degree of the moving path measured when the vehicle is set to run on the same path and moved. Likewise, the determination unit 1160 may determine the predetermined distance based on the height of a level difference in the traveling environment of the vehicle measured by the position and orientation information acquisition unit 1140. The predetermined value Δm may be set so as to be proportional to a vertical shake or inclination of the vehicle measured when the vehicle is moved. For example, in a case where any portion on the running path has a level difference or inclination, there is a risk that the vehicle vertically shakes and the cargo collides with the ceiling or a monitoring camera. In this case, the predetermined value Δm may be set in terms of the height of the level difference for the entire running path or regions having a level difference with a predetermined height or unevenness. With respect to data of unevenness on the running surface, it is preferable to run the vehicle on the running path and measure changes of three-dimensional positions in the height direction in advance. Maintaining a predetermined distance or longer between an obstacle and the cargo enables further restricting the possibility that the cargo collides with the obstacle.

According to the first exemplary embodiment, the storage unit 1150 stores the occupancy map as a control map and acquires an optimal path based on the occupancy map, and the determination unit 1160 acquires the control values of the vehicle. A second exemplary embodiment will be described below based on a method for controlling the vehicle by calculating the position of the vehicle including the cargo based on an image captured by the environmental sensor 120, without storing a control map.

FIG. 7 illustrates an example of a functional configuration of the information processing apparatus 10 according to the present exemplary embodiment. The information processing apparatus 10 according to the present exemplary embodiment differs from the information processing apparatus 10 according to the first exemplary embodiment in that the storage unit 1150 is absent. The present exemplary embodiment will be described below centering only on components newly added to and components having different functions from components according to the first exemplary embodiment. Other components are assumed to have the same functions as those illustrated in FIGS. 1 and 2, and redundant descriptions thereof will be omitted.

The determination unit 1160 determines the control values for performing movement control on the AGV based on environmental images, the position and orientation information of the environmental sensor 120 acquired by the position and orientation information acquisition unit 1140, the contour shape of the cargo acquired by the cargo information acquisition unit 1120, and the target position and orientation. Unlike the first exemplary embodiment, the target position and orientation of the vehicle are directly input from the vehicle management system 13 to the determination unit 1160 via a communication apparatus (not illustrated). The determination unit 1160 outputs the determined control values to the actuator unit 130.

Procedures of the entire processing according to the present exemplary embodiment are similar to those illustrated in FIG. 5. The present exemplary embodiment will be described below centering only on procedures performing different processing from procedures according to the first exemplary embodiment. Other procedures are assumed to have the same processing as those illustrated in FIG. 5, and redundant descriptions thereof will be omitted.

In step S160 illustrated in FIG. 5, based on the contour shape of the cargo 15 estimated by the cargo information acquisition unit 1120, the depth map input to the environmental image input unit 1130, and the target position of the vehicle, the determination unit 1160 determines the control values of the vehicle which moves to the target position while avoiding obstacles. More specifically, based on the current position and orientation of the vehicle and the input target position and orientation, the determination unit 1160 acquires all of possible variations of the control values (forward speed, turning direction, and turning speed) for minimizing the Euclidean distance between the two different positions and orientations, as control value candidates. For each control value candidate, the determination unit 1160 acquires the prediction position and orientation after control. Then, the determination unit 1160 calculates the closest distance between the contour shape and position of the vehicle including the cargo in the prediction position and orientation and the three-dimensional point group obtained from the depth map input from the environmental image input unit 1130. When the distance is equal to or less than a predetermined value, the determination unit 1160 determines the danger of collision and therefore cancels the control value candidates for the acquired prediction position and orientation. Among form the control value candidates that are not canceled, the determination unit 1160 selects the control values for minimizing the Euclidean distance between the target and the prediction positions and orientations as final control values. The determination unit 1160 outputs the determined control values to the actuator unit 130.

The second exemplary embodiment has been described above centering on a method for acquiring the contour shape and position of the vehicle including the cargo based on an image input from the environmental sensor 120, without storing the control map, to control the vehicle. Even in a case where the control map is not stored, vehicle control can be safely performed by acquiring the distance between the vehicle and an obstacle in the environment from images time-sequentially input from the environmental sensor 120 within a range observed each time.

According to the first exemplary embodiment, the information processing apparatus 10 measures the contour shape of the cargo 15 only once from the depth map acquired by the cargo sensor 110, acquires a moving path in consideration of contact between the vehicle including the measured shape of the cargo and an obstacle in a scene, and controls the vehicle. A third exemplary embodiment will be described below centering on a method for controlling the vehicle based on the shape and position of the cargo by constantly tracking the shape and position of the cargo 15.

The configuration of the information processing apparatus 10 according to the present exemplary embodiment is similar to that according to the first exemplary embodiment (FIG. 3), and redundant descriptions thereof will be omitted. The cargo information acquisition unit 1120 stores not only the contour shape information for the cargo 15 according to the first exemplary embodiment but also information about the shape and position of the cargo 15 at the previous time so that time-sequential changes of the contour shape can be calculated. Then, the cargo information acquisition unit 1120 also outputs time-sequential change information for the cargo 15 to the determination unit 1160. The determination unit 1160 determines the control values for controlling the AGV based not only on the information according to the first exemplary embodiment but also on the time change information for the cargo 15 acquired by the cargo information acquisition unit 1120. The present exemplary embodiment differs from the first exemplary embodiment in this point.

FIG. 8 illustrates processing performed by the information processing apparatus 10 applied to the vehicle called an automated guided vehicle (AGV) according to the present exemplary embodiment. The present exemplary embodiment will be described below centering only on procedures performing different processing from procedures according to the first exemplary embodiment. Other procedures are assumed to have the same processing as those illustrated FIG. 5, and redundant descriptions thereof will be omitted.

In step S230, like step S130 according to the first exemplary embodiment, the cargo information acquisition unit 1120 acquires information about a three-dimensional bounding box as a contour shape of the cargo 15 from the depth map. Then, the cargo information acquisition unit 1120 acquires the difference between the stored value of the three-dimensional bounding box at the previous time and the value at the present time to acquire variation of the contour shape and position of the cargo 15 since the previous time till the present time. The cargo information acquisition unit 1120 stores as variations a total of six parameters including three parameters of variation in size (height, width, and depth) of the bounding box and three parameters of variation in position. At the end, the cargo information acquisition unit 1120 outputs the acquired values of the contour shape of the cargo 15 at the present time and variation thereof to the determination unit 1160.

In step S260, based on the contour shape of the cargo 15 estimated by the cargo information acquisition unit 1120 and the occupancy map stored in the storage unit 1150, the determination unit 1160 determines the control values of the vehicle moving toward the target position and orientation while avoiding obstacles. According to the present exemplary embodiment, the determination unit 1160 determines the control values based also on variations of the shape and position of the cargo 15 acquired by the cargo information acquisition unit 1120. After determining the control values of the vehicle through the processing according to the first exemplary embodiment, the determination unit 1160 further determines the final control values of the vehicle based on variations of the shape and position of the cargo 15 acquired by the cargo information acquisition unit 1120.

More specifically, the determination unit 1160 checks variations of the contour shape and position of the cargo 15. When either or both of variations are equal to or larger than a predetermined value, the determination unit 1160 determines the occurrence of a collapse or slide of the cargo 15 and acquires the control values for decelerating or stopping the vehicle. On the other hand, when variations of the cargo 15 are zero or small, the determination unit 1160 determines stable conveyance of the cargo 15 and uses the control values acquired through the method described in step S160 according to the first exemplary embodiment. In addition, when variations of the cargo 15 are neither so large as to cause a collapse or slide of the cargo 15 nor so small as to be regarded as zero, the determination unit 1160 determines the occurrence of a shake of the cargo 15, determines a range of shake, and acquires the control values. More specifically, the determination unit 1160 adds the values of the three-dimensional bounding box representing the contour shape of the cargo 15 and variations of the shape and position of the cargo 15 to acquire the contour shape of the cargo which includes the maximum shaking width. Based on this, the determination unit 1160 acquires the contour shape of the entire vehicle described in step S160 and determines the control values. The determination unit 1160 outputs the determined control values to the actuator unit 130.

In step S170, the determination unit 1160 determines whether the system is be ended. More specifically, like step S170 according to the first exemplary embodiment, when the Euclidean distance between the destination coordinates stored in the storage unit 1150 and the position and orientation of the environmental sensor 120 acquired by the position and orientation information acquisition unit 1140 is equal to or less than a predetermined threshold value (for example, 1 m), the determination unit 1160 determines that the vehicle has reached the destination (YES in step S170), and the determination unit 1160 ends the system. On the other hand, when the Euclidean distance exceeds the predetermined threshold value (NO in step S170), the processing returns to step S120. Then, the information processing apparatus 10 continues the processing.

The third exemplary embodiment has been described above centering on a method for measuring and tracking the shape and position of the cargo 15 for each frame to acquire variations of the shape and position, determining a state transition such as a slide or collapse of the cargo 15 based on variations, and changing the vehicle control. When there is a state transition of the cargo 15, the information processing apparatus 10 stops the vehicle, limits the maximum speed, and performs other control based on the calculation of contact between the vehicle and the environment in consideration of the shaking width of the cargo 15. This enables safe vehicle control in consideration of collapse, slide, shake, and other temporal changes of the cargo 15.

(Modification 3-1)

Although, in the present exemplary embodiment, the determination unit 1160 determines the control values of the vehicle based on variations of the shape and position of the cargo 15, the present disclosure is not limited thereto. For example, when the occurrence of a collapse or slide of the cargo 15 is determined based on variations, the information processing apparatus 10 generates an alarm (not illustrated) to present the abnormal condition to the outside instead of acquiring the control values. Alternatively, the information processing apparatus 10 turns on an indicator (not illustrated) to present the abnormal condition. Alternatively, the information processing apparatus 10 communicates with the vehicle management system 13 to notify that an abnormal condition has occurred.

User interfaces (UIs) applicable in common to the first to the third exemplary embodiments will be described below. The following describes user operations for confirming the visual information acquired by the imaging apparatus H19, and the position and orientation information, object detection result, and map information acquired by the acquisition units. The following also describes that an AGV operates through automated control and therefore is controlled by user inputs. To enable the user to confirm the condition of the AGV and control the AGV, a graphical user interface (GUI) is displayed on a display as a display apparatus. The user inputs operations from an input apparatus such as a mouse and touch panel. Although, in a fourth exemplary embodiment, a display is mounted on the AGV, the present disclosure is not limited to such a configuration. More specifically, a liquid crystal display connected to the vehicle management system 13 is used as a display apparatus via the communication OF H17. The vehicle management system 13 uses the display of the user's mobile terminal as a display apparatus. When using the display apparatus mounted on the AGV or when using a display apparatus not mounted on the AGV, display information can be generated by the information processing apparatus 10. When using a display apparatus not mounted on the AGV, a computer included in the display apparatus may acquire information required to generate display information from the information processing apparatus 10 and generate display information.

Figure 10:
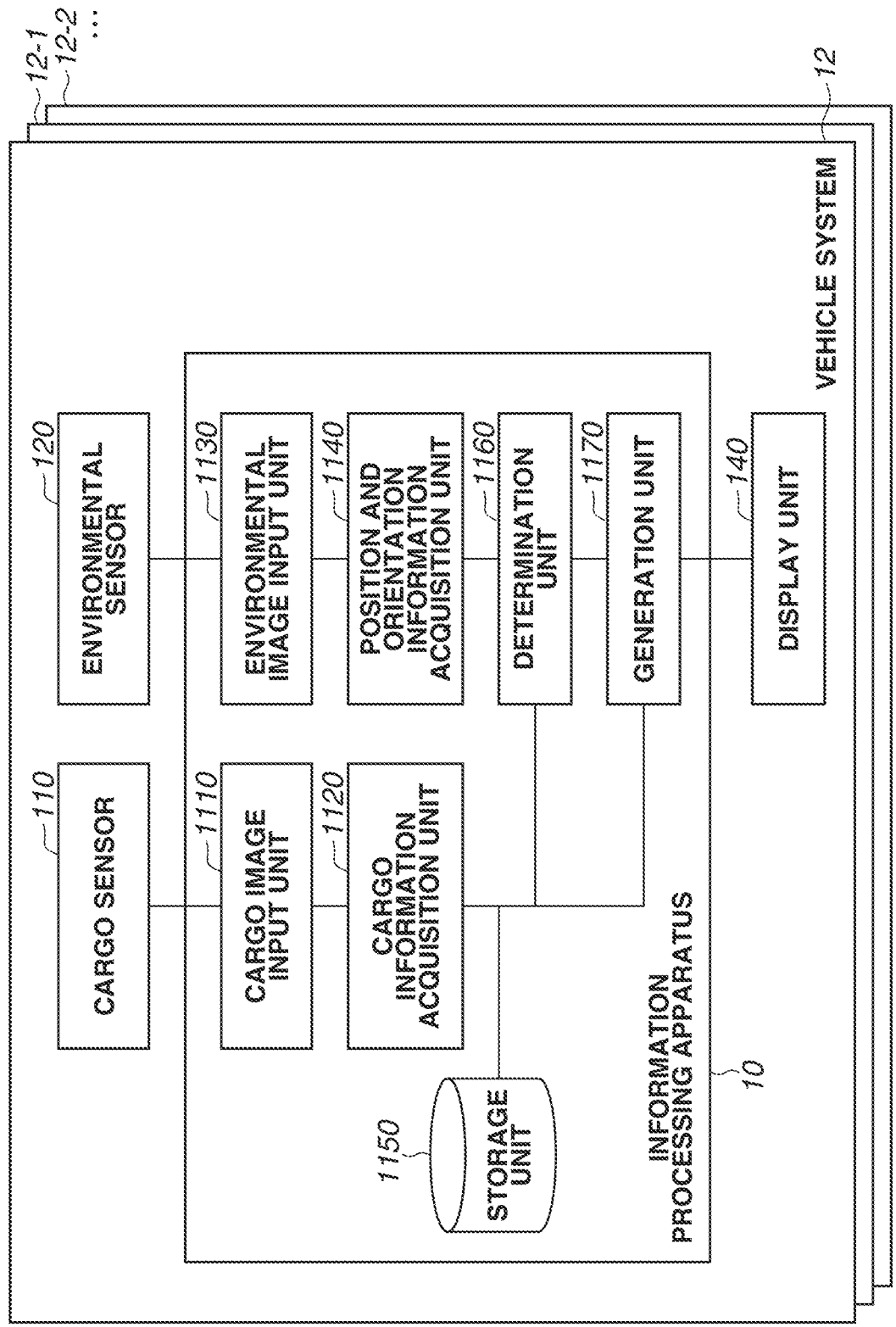
FIG. 10 is a block diagram illustrating still another example of a functional configuration of the vehicle system.

The configuration of the apparatus according to the fourth exemplary embodiment has the functional configuration illustrated in FIG. 3 and includes a generation unit 1170 illustrated in FIG. 10. The generation unit 1170 generates display information based on the cargo image acquired by the cargo sensor 110, the position and orientation of the vehicle acquired by the position and orientation information acquisition unit 1140, the image acquired by the environmental sensor 120, the cargo information measured by the first acquisition unit 1120, and the control values acquired by the determination unit 1160. The display unit 140 displays the generated display information on a touch-panel display mounted on the AGV. The display information will be described in detail below.

FIG. 9 illustrates a GUI 100 as an example of display information presented by the display apparatus according to the present exemplary embodiment. A window G110 presents a two-dimensional occupancy map. A window G120 presents a three-dimensional occupancy map stored in the storage unit 1150. A window G130 presents the image acquired by the environmental sensor 120. A window G140 presents the image acquired by the cargo sensor 110. A window G150 presents the position and orientation acquired by the position and orientation information acquisition unit 1140, the information about the cargo 15 measured by the cargo information acquisition unit 1120, and the display information related to the control values determined by the determination unit 1160.

The window G110 presents an example of a two-dimensional occupancy map as a projection of the three-dimensional occupancy map stored in the storage unit 1150 on the flat floor surface. An AGV G111 mounts the environmental sensor 120 and the cargo sensor 110. The AGV G111 displays the contour shape of the AGV calculated based on the contour shape of the cargo 15 measured by the cargo sensor 110. The position and orientation information acquisition unit 1140 combines the contour shape of the AGV on the two-dimensional (2D) map based on the position and orientation of the environmental sensor 120 (position and orientation of the AGV). A balloon G112 is an example presentation of a warning alert. For example, the balloon G112 displays an alert when the determination unit 1160 detects a collapse or slide of the cargo 15 based on variation of the cargo 15 acquired by the cargo information acquisition unit 1120 by using the method according to the second exemplary embodiment. An arrow G113 is an example presentation of a scheduled running path of the AGV based on the control values determined by the determination unit 1160. Referring to FIG. 9, the AGV is advancing to a destination G114. Presenting a 2D map, the AGV position, an abnormal condition alert, and a moving path in this way enables the user to easily grasp the operation status of the AGV. The objects G111 to G114 may be changed in color, line thickness, and shape to make it easier for the user to grasp the operation status.

A window G120 presents an example of a three-dimensional occupancy map stored in the storage unit 1150. An object G121 presents the contour shape of the cargo 15 acquired by the cargo information acquisition unit 1120, on an AGV model. An object G122 is an example presentation of a partial map as a result of extracting a range where an obstacle can contact the contour shape of the AGV including the cargo 15. The window G110 presents a two-dimensional occupancy map as a projection of the three-dimensional occupancy map in this range on the flat floor surface. Presenting a three-dimensional occupancy map in this way enables the user to grasp the operation status while monitoring a three-dimensional contact between obstacles having different heights existing in the environment and the AGV and cargo.

A window G130 presents an example of an image acquired by the environmental sensor 120. Like the window G130, the traveling directions of another AGV may be displayed with an arrow. Arrow display is generated based on information acquired from the vehicle management system 13.

A window G140 presents an example of a captured image of the cargo 15 acquired by the cargo sensor 110. An object G141 is an example presentation of information about the contour shape and position of the cargo 15 and the cargo type acquired by the cargo information acquisition unit 1120 according to the first exemplary embodiment. An arrow G142 presents an example of a contour shape of the cargo 15 including the shaking width of cargo 15 obtained from variations of the shape and position of the cargo 15 according to the second exemplary embodiment. Although arrows related to the three axes are displayed in this case, the range where the cargo exists may be displayed as a wire frame. This enables the user to intuitively grasp the cargo status including the size and position of the cargo 15.

The window G150 presents examples of a GUI for manually operating the AGV, a position and orientation of the AGV acquired by the position and orientation information acquisition unit 1140, control values determined by the determination unit 1160, and a target position and orientation of the AGV. By touching an emergency stop button G151 with a finger, the user can stop the movement of the AGV. A mouse cursor G152 can be moved in response to a touch operation of the user through the mouse, controller, and touch panel (not illustrated). Buttons and radio buttons in the GUI can be operated by using the mouse cursor G152. An object G153 is an example presentation of the controller of the AGV. By horizontally and vertically moving the circle inside the controller, the user can perform back-and-forth and lateral operations of the AGV in response to these inputs. An object G154 is an example presentation of the internal state of the AGV. The object G154 illustrates an example of an operating state where the AGV is automatically running at 0.5 m/s. Together with the running speed, the object G154 also presents the time since the AGV has started running, the remaining time to reach the destination, and the target position and orientation such as the difference from the expected time of arrival. An object G156 is a GUI for setting operations and display information of the AGV. The user can perform operations for specifying whether to generate map information and whether to present detected objects. An object G157 is an example presentation of the target position and orientation of the AGV. The object G157 presents examples of a position and orientation acquired by the second acquisition unit 1140, destination coordinates received from the vehicle management system 13, and names of articles conveyed by the AGV. Presenting the target position and orientation and a GUI related to user inputs in this way enables the user to more intuitively operate the AGV.

Figure 11:
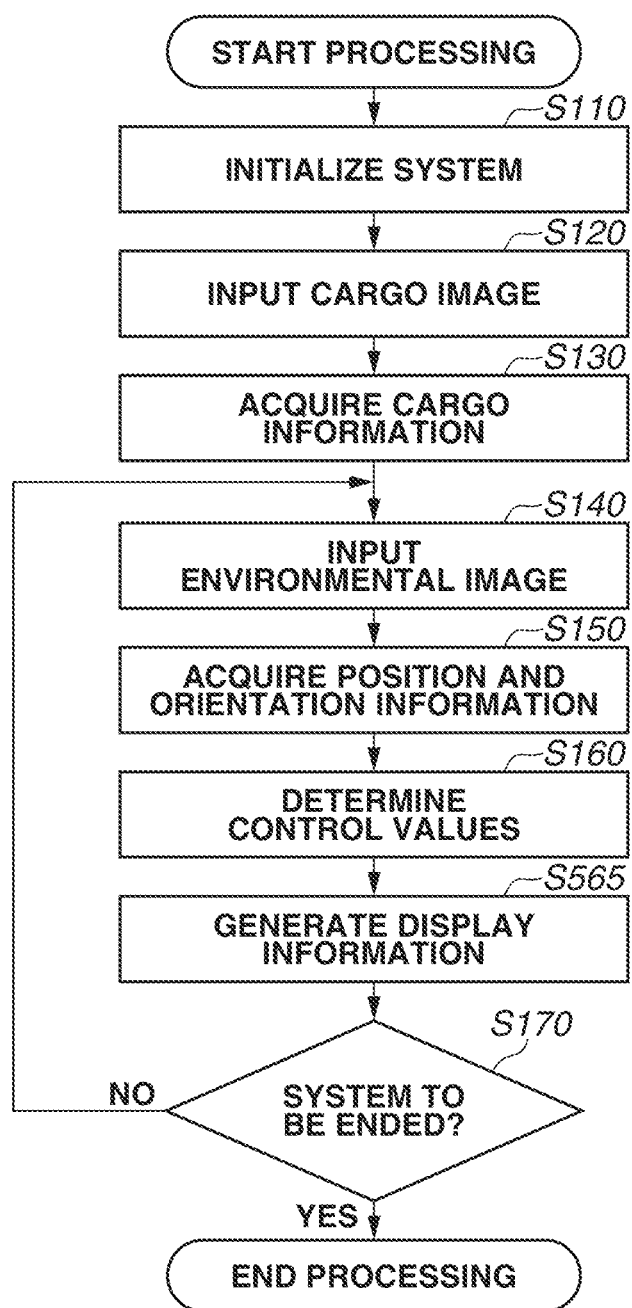
FIG. 11 is a flowchart illustrating still another processing performed by the information processing apparatus.

Processing performed by the information processing apparatus 10 will be described below with reference to FIG. 11. In step S565, the generation unit 1170 generates display information based on a captured image, the shape of the cargo acquired by the cargo information acquisition unit 1120, the position and orientation of the vehicle acquired by the position and orientation information acquisition unit 1140, and the occupancy map or the control values determined by the determination unit 1160. Then, the generation unit 1170 outputs the display information to the display unit 140.

According to the fourth exemplary embodiment, the generation unit 1170 generates display information based on a captured image, the shape of the cargo acquired by the cargo information acquisition unit 1120, the position and orientation of the vehicle acquired by the position and orientation information acquisition unit 1140, and the occupancy map or the control values determined by the determination unit 1160. This enables the user to easily confirm the state of the information processing apparatus 10. The user also inputs control values, various parameters, and a display mode of the AGV, making it easier to change and move various settings of the AGV. Presenting a GUI in this way enables easily operating the AGV.

A fifth exemplary embodiment will be described below centering on an information processing apparatus for recommending to the user the conveyance amount and the moving path which enable efficient execution of a task based on the destination and the cargo type of the vehicle. Normally, for example, when conveying the same cargo in several times (or with several vehicles), the total time required for the task can be reduced by loading an as large an amount of cargo as possible for each conveyance. However, depending on environment, paths along which the vehicle can run are limited when conveying a large amount of cargo. In such a case, the time to be required may increase as a result of bypassing. More specifically, the amount of cargo and a method for stacking the cargo optimal for minimizing the time to be required may depend on environment. According to the present exemplary embodiment, an optimal combination of the conveyance amount and the conveyance path is presented to the user in consideration of the cargo size and the environmental structure. This makes it possible to efficiently control the vehicle.

Figure 12:
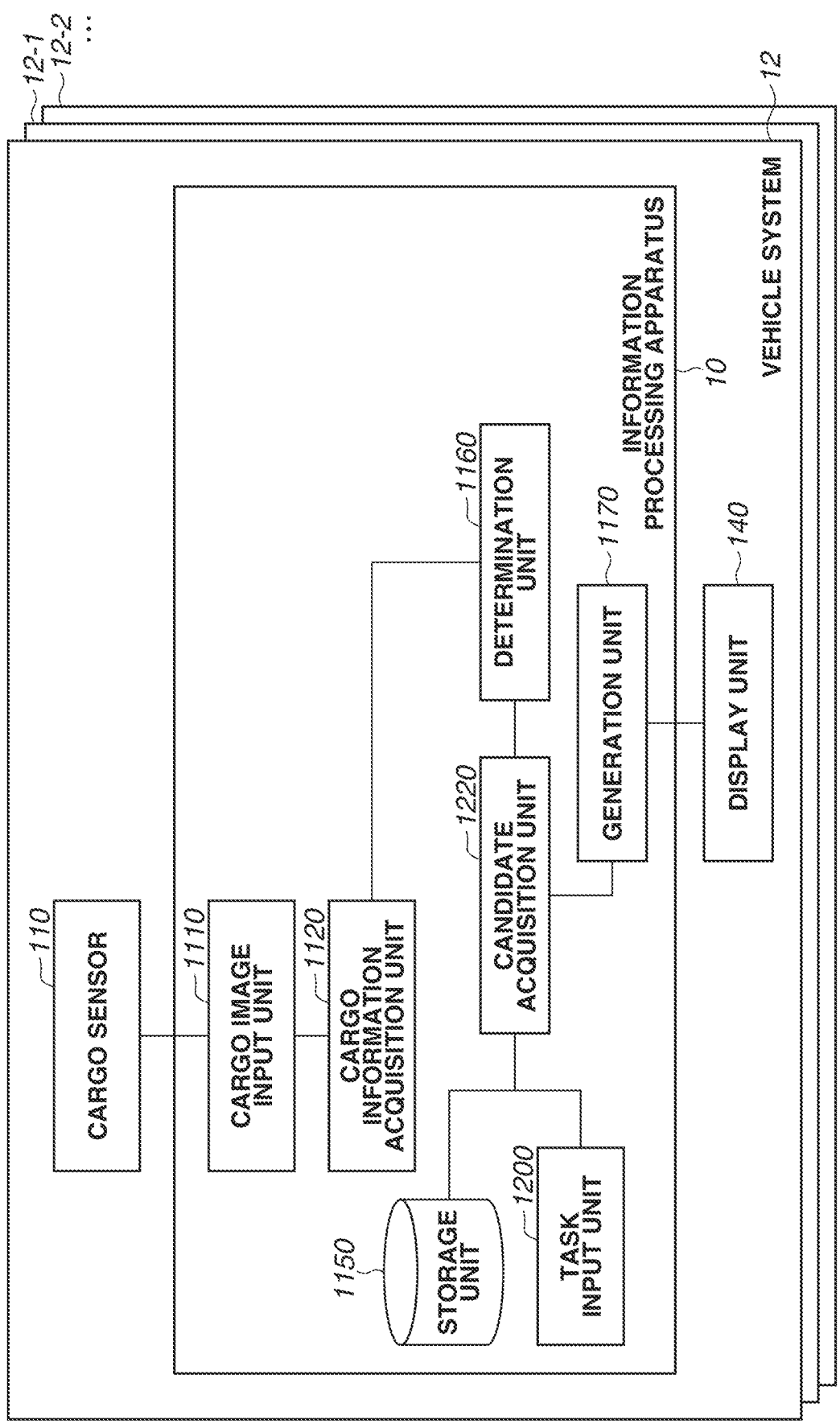
FIG. 12 is a block diagram illustrating still another example of a functional configuration of the vehicle system.

An example of a functional configuration of the information processing apparatus 10 will be described below with reference to FIG. 12. For functional components similar to those of the first exemplary embodiment, redundant descriptions thereof will be omitted.

A task input unit (third input unit) 1200 inputs task information indicating the destination coordinates or the total amount and size of the cargo to be conveyed based on the task. The destination coordinates included in the task information is to be associated with the control map stored in the storage unit 1150. The total amount of cargo to be conveyed based on the task is also included in the task information. Cargo information indicating the three-dimensional shape data indicating the size per cargo unit is assumed to be known. The cargo information indicates, for example, that the cargo is a cube and an oblong rectangular parallelepiped and 10 cargo units are conveyed. The conveyance amount for the vehicle in one process (for example, 4 cargo units) may be input by the user by using a UI. The method for stacking the cargo may be specified by the user. For example, when loading four pieces of cubical cargo on the vehicle, the user inputs a stacking method (flat stack (4×1 stack), 2×2 stack, or simple stack (1×4 stack)).

The candidate acquisition unit (third acquisition unit) 1220 acquires at least one candidate of the combination of the conveyance amount and the moving path based on the task information and the control map. A candidate of a combination of the conveyance amount and the moving path is, for example, the following information. For a combination of a conveyance amount of 4 and a moving path of a route 1, the time to be required is 50 seconds. For a combination of a conveyance amount of 5 and a moving path of the route 1, the time to be required is 1 minute. With respect to these pieces of information, the candidate acquisition unit 1220 acquires a combination of the conveyance amount and the moving path in consideration of the size of the cargo and the structure of the running environment for the vehicle. When conveying a plurality of cargos, since the shape of the entire cargo changes with the stacking method, the candidate acquisition unit 1220 acquires a plurality of variations of stacking methods.

Figure 13:
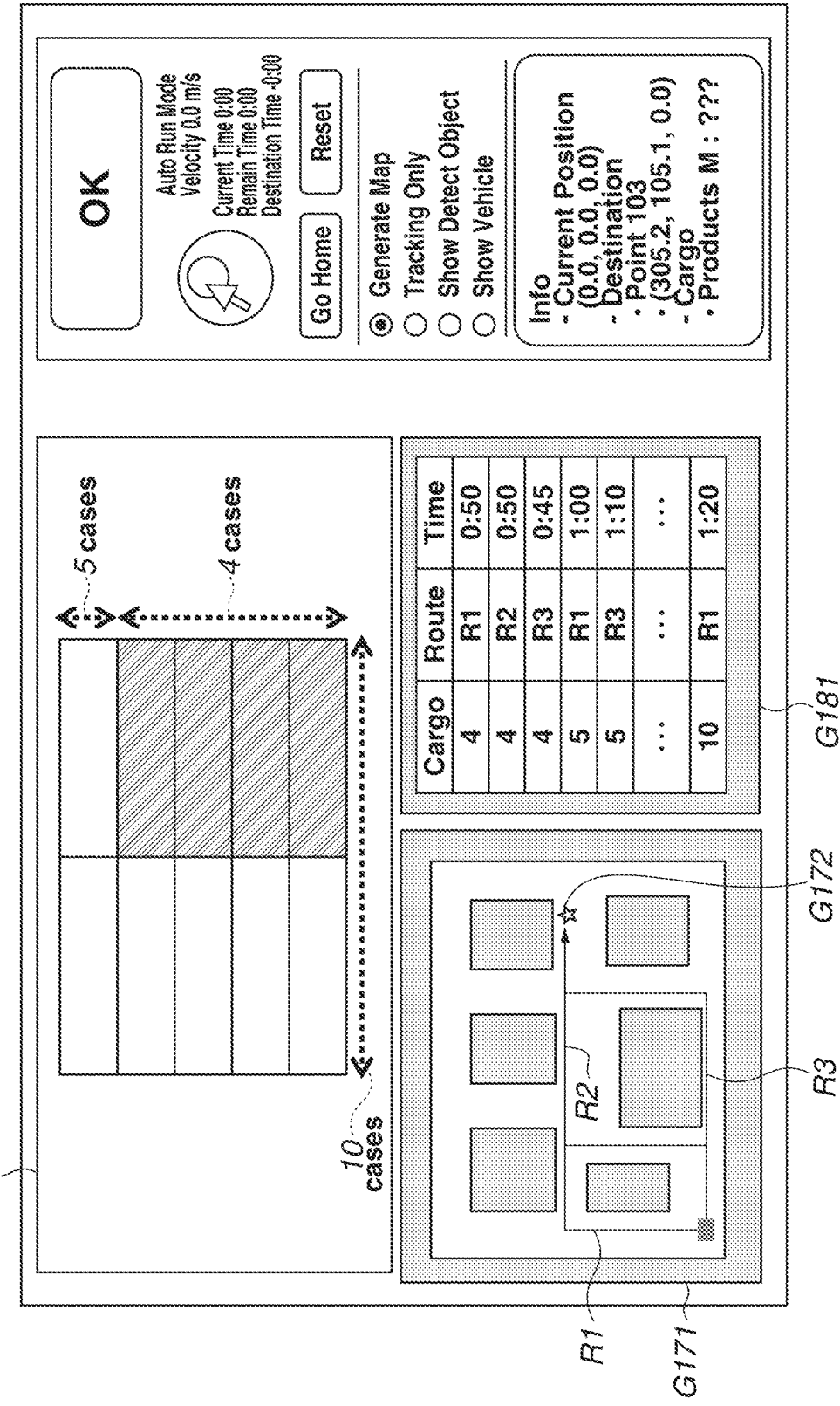
FIG. 13 illustrates another example of a GUI for presenting display information.

The generation unit 1170 generates display information for displaying the candidates acquired by the candidate acquisition unit 1220 on a display. When recommending a conveyance amount to the user, for example, a conveyance amount with the shortest time to be required is recommended. With the conveyance amount fixed, candidates of stacking methods and paths may be recommended. When recommending a stacking method, a moving path and a time to be required are associated with a candidate of each stacking method (for example, flat stack or simple stack). When recommending paths, an optimal conveyance amount or stacking method is associated with a candidate of each path. For example, for a short cargo and a flat stack of cargo, a moving path with a partially low ceiling can be recommended. For a moving path with a partially low ceiling, vehicles which can run are limited, and therefore a confusion of a plurality of vehicles may be avoided. For example, the above-described pieces of information are presented to the user through a GUI as illustrated in FIG. 13. An image G160 indicates an estimated value of the shape of a cargo based on the loading amount (conveyance amount) of the cargo. For example, when the conveyance amount is 4, it is assumed that the cargo is loaded in a shape drawn as the shaded portion illustrated in FIG. 13. The candidate acquisition unit 1220 acquires candidates of paths by using this shape of the cargo. A control map G171 indicates a destination G172 and paths corresponding to candidates of conveyance amounts. This map is, for example, the above-described control map (occupancy map). A route R1 as an example path includes a sufficient width and height of the passage. A route R2 has a sufficient height and a smaller width than the route R1. A route R3 has the smallest width and height of the passage. A list G181 indicates candidates of combinations of the conveyance amount and the moving path. The list G181 also displays predicted values of the time required corresponding to the conveyance amount and the moving path.

The determination unit 1160 determines the control values based on a predetermined criterion based on the candidates of combinations of the conveyance amount and the moving path. As an example of a predetermined criterion, a combination with the shortest time to be required is determined. The determination unit 1160 may determine the control values according to an instruction by the user. Alternatively, the user may determine the control values by selecting a desirable combination of the conveyance amount and the moving path from such a list as the list G181 illustrated in FIG. 13. As required, the determination unit 1260 determines the control values based on the matching with the information (first information) about the actually loaded cargo acquired from the cargo information acquisition unit 1120.

Processing performed by the information processing system 1 will be described below with reference to FIG. 14. In step S1410, the information processing system 1 initializes the current position of the vehicle, the cargo information, the control map, and the task information. In step S1420, a task input unit 1200 inputs the task information indicating the destination coordinates or the total amount and size of the cargo to be conveyed based on a task. In this case, the destination coordinates are assumed to be input to the task input unit 1200 by the user. Information about the destination may be acquired from the process management system 14 via a communication unit (not illustrated). The task input unit 1200 inputs the task information indicating the total amount of the cargo. In step S1430, the candidate acquisition unit 1220 acquires at least one combination of the conveyance amount and the moving path based on the task information and the control map. First of all, based on the cargo information acquired in step S1410, the candidate acquisition unit 1220 estimates the amount of cargo which can be loaded on the vehicle. The cargo information is three-dimensional shape data per cargo unit. The three-dimensional shape of the loading space of the vehicle is assumed to be known. The candidate acquisition unit 1220 estimates the maximum conveyance amount based on the three-dimensional shape of the loading space of the vehicle and the three-dimensional shape per cargo unit. The candidate acquisition unit 1220 also estimates the method for stacking the cargo and the shape of the cargo based on the amount of the cargo (from one cargo unit to the maximum conveyance amount). Based on the estimated three-dimensional shape, the task information, and the control map, the candidate acquisition unit 1220 estimates a moving path along which the vehicle conveying an amount X of the cargo can run. Then, the candidate acquisition unit 1220 acquires the time required for running the moving path. In step S1440, the generation unit 1170 generates display information for displaying the combination acquired by the candidate acquisition unit 1220 (more specifically, the moving paths) on a display. For example, the display information displays an image for estimating the view when the cargo is loaded, and the moving paths from the current position of the vehicle to the destination. In step S1450, the determination unit 1160 determines the control values based on candidates of combinations of the conveyance amount and the moving path based on a predetermined criterion. When there is a plurality of candidates for a certain conveyance amount, the determination unit 1260 determines a conveyance amount which satisfies a predetermined condition, among from the candidates. For example, when the user wants to run the vehicle on the moving path along which the vehicle can run in the shortest time, the determination unit 1260 determines a combination of the conveyance amount and the moving path with which the total time required for the task is minimized by specifying time as a condition. The determination unit 1260 obtains the control values based on the conveyance amount and the moving path that has been determined. According to a user input, the determination unit 1260 may determines the conveyance amount or the moving path among from the combination candidates presented in the list G181. In step S1460, the cargo sensor 110 captures an image of the cargo loaded on the vehicle. In step S1470, the cargo information acquisition unit 1120 acquires the cargo information (first information) based on the image of the cargo captured in step S1460. In step S1480, the cargo information acquisition unit 1120 compares the first information with the determined combination of the cargo and the control values to confirm whether the cargo determined in step S1450 is loaded. When the cargo information acquisition unit 1120 confirms that the specified cargo is correctly loaded (YES in step S1480), the processing proceeds to step S1490. On the other hand, when the difference between the amount of cargo that has been determined and the amount of cargo obtained from the first information is larger than a predetermined value (for example, larger or less than one cargo unit) (NO in step S1480), the processing returns to step S1450. In step S1490, the actuator unit 130 runs the vehicle according to the control values corresponding to the determined path. The above-described processing makes it possible to suitably combine the amount of the cargo to be loaded on the vehicle and the moving path, achieving efficient control of the vehicle.

(Other Modifications)

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

The environmental image input unit 1130 according to the present disclosure may be of any type as long as it inputs information about the surrounding environment acquired by the environmental sensor 120 mounted on the vehicle. The information about the surrounding environment to be input is at least one of a normal image, a parallax image, a depth map in which the depth value is stored in each pixel of an image, and a point cloud storing the three-dimensional coordinates of points of a scene for the imaging apparatus H19. In addition to these, the environmental image input unit 1130 may input three-dimensional information measured by a three-dimensional measurement apparatus such as a LiDAR camera or a ToF camera, and the target and the current positions and orientations of the vehicle received from the vehicle management system 13 via the communication OF H17. Together with these pieces of information, parameters of the imaging apparatus H19, such as the focal length, the lens center, and lens distortion, can also be input to the information processing apparatus 10.

The position and orientation information acquisition unit 1140 according to the present disclosure may be of any type as long as it acquires the position and orientation of the vehicle by using the information about the surrounding environment input by the environmental image input unit 1130. The position and orientation information acquisition unit 1140 may obtain the position and orientation of the vehicle based on the ICP algorithm by using a three-dimensional point group representing a scene in the environment and a depth map input from the environmental image input unit 1130 or based on the SLAM technique using a grayscale image. The position and orientation information acquisition unit 1140 may obtain the position and orientation of the vehicle by using together a Wi-Fi communication status and a beacon installed in the environment.

The storage unit 1150 according to the present disclosure may be of any type as long as it stores a control map to be referenced to control the vehicle. A control map may be of any type as long as it represents the environmental structure and space. An occupancy map is an example of a control map. In the occupancy map, a scene is divided in a lattice form, and the obstacle existence probability for each lattice is stored. The occupancy map may be stored as a three-dimensional voxel space (X, Y, Z) in the world coordinate system or a two-dimensional grid space (X, Y) from which height direction information is excluded. Alternatively, like a position and orientation estimation map, for example, three-dimensional point group data (combined with color information), a set of key frame data (a combination of a depth map associated with the position and orientation in the environment and color information), and a three-dimensional model of the environment are also applicable.

The cargo image input unit 1110 according to the present disclosure may be of any type as long as it inputs information about the shape, position, and/or object type of the cargo conveyed by the vehicle. The shape of the cargo is, for example, contour shape information represented by a three-dimensional bounding box (three parameters indicating the barycentric position, and three parameters indicating the size of the bounding box) of the cargo. The shape of the cargo may also be represented by three-dimensional point group data (combined with color information) and three-dimensional mesh data. In addition, the shape of the cargo may also be represented as an occupancy map like a control map.

The determination unit 1160 according to the present disclosure may be of any type as long as it determines the control values for controlling the movement of the vehicle. For example, based on the occupancy map stored in the storage unit 1150 and the cargo shape input by the first input unit, the determination unit 1160 determines the control values with which the cargo does not contact the surrounding environment. In determining the control values, the determination unit 1160 determines the control values by determining and extracting a control map of a range where the cargo can contact the surrounding environment. Alternatively, the determination unit 1160 determines the control values by using a two-dimensional control map as a projection of a three-dimensional control map on the flat floor surface.

The present disclosure is also implemented by performing the following processing. More specifically, software (program) for implementing the functions of the above-described exemplary embodiments is supplied to a system or apparatus via a data communication network or various types of storage media, and a computer (CPU or micro processing unit (MPU)) of the system or apparatus reads and executes the program. The program may be provided in a form recorded in a computer-readable recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus for determining control values for controlling a position of a vehicle for conveying a cargo, the information processing apparatus comprising:
one or more processors configured to function as:
an acquisition unit configured to acquire first information for identifying a three-dimensional shape of the cargo,
a storage unit configured to store a three-dimensional map representing three-dimensional image features of an environment generated based on a captured image of the environment;
a generation unit configured to generate from the three-dimensional map a two-dimensional map indicating objects in the environment based on height information included in the first information; and
a determination unit configured to, based on the two-dimensional map, determine the control values for preventing the cargo and the object from coming closer than a predetermined distance in the two dimensional map.

2. The information processing apparatus according to claim 1, wherein the acquisition unit acquires the first information based on a learned model which inputs a first image and outputs a size of the cargo.

3. The information processing apparatus according to claim 1, wherein the acquisition unit acquires a position of the vehicle based on the captured image, and wherein the determination unit determines the control values for reaching a predetermined destination position from the position of the vehicle.

4. The information processing apparatus according to claim 1, wherein the first information is information indicating a size of the cargo in a height direction.

5. The information processing apparatus according to claim 1, wherein the determination unit determines the predetermined distance based on a height of a level difference existing on a running path in the environment.

6. The information processing apparatus according to claim 1, wherein the first information is information indicating a size of a portion of the cargo protruding from the vehicle in a width direction.

7. The information processing apparatus according to claim 1, wherein the acquisition unit acquires the first information by using a first image captured by an imaging apparatus mounted on the vehicle.

8. The information processing apparatus according to claim 7, wherein the first image is captured by an imaging apparatus disposed at a position at which the vehicle and the cargo can be observed.

9. The information processing apparatus according to claim 7, wherein the acquisition unit acquires information indicating a type of the cargo based on the first image, and wherein the determination unit determines the control values depending on the type of the cargo based on the information indicating the type of the cargo.

10. The information processing apparatus according to claim 7, wherein the acquisition unit updates the first information based on a change of the first image, and wherein the determination unit determines the control values depending on a shape of the cargo in a case where the shape of the cargo changes, based on the updated first information.

11. The information processing apparatus according to claim 1, wherein the captured image is captured by an imaging apparatus mounted on the vehicle.

12. The information processing apparatus according to claim 1, further comprising a display unit configured to, based on the control values determined by the determination unit, show display information indicating a moving path of the vehicle.

13. An information processing apparatus for determining control values for controlling a position of a vehicle for conveying a cargo, the information processing apparatus comprising:
one or more processors configured to function as:
an acquisition unit configured to acquire a combination of an amount of the cargo and a moving path based on information for identifying a three-dimensional shape of the cargo estimated, and a three-dimensional map representing three-dimensional image features of an environment where the vehicle moves;
a generation unit configured to generate from the three-dimensional map a two-dimensional map indicating objects in the environment based on height information included in the information for identifying a three-dimensional shape of the cargo; and
a determination unit configured to, based on the combination and the two-dimensional map, determine the control values for running on the moving path where the cargo and an object in the environment do not interfere with each other.

14. An information processing method for determining control values for controlling a position of a vehicle for conveying a cargo, the information processing method comprising:
acquiring first information for identifying a three-dimensional shape of the cargo, and a three-dimensional map representing three-dimensional image features of the environment generated based on a captured image of the environment;
generating from the three-dimensional map a two-dimensional map indicating objects in the environment based on height information included in the first information; and
determining, based on the two-dimensional map, the control values for preventing the cargo and the object from coming closer than a predetermined distance in the two-dimensional map.

15. An information processing system including an imaging apparatus and an information processing apparatus for determining control values for controlling a position of a vehicle for conveying a cargo,
wherein the imaging apparatus is disposed at a position at which the vehicle and the cargo can be observed, and
wherein the information processing apparatus comprises:
an acquisition unit configured to acquire first information for identifying a three-dimensional shape of the cargo, and a three-dimensional map representing three-dimensional image features of the environment generated based on a captured image of the environment;
a generation unit configured to generate from the three-dimensional map a two-dimensional map indicating objects in the environment based on height information included in the first information; and
a determination unit configured to, based on the two-dimensional map, determine the control values for preventing the cargo and the object from coming closer than a predetermined distance in the two-dimensional map.

16. A non-transitory computer-readable storage medium storing a program for causing a computer to execute an information processing method for determining control values for controlling a position of a vehicle for conveying a cargo, the information processing method comprising:
acquiring first information for identifying a three-dimensional shape of the cargo, and a three dimensional map representing three-dimensional image features of the environment generated based on a captured image of the environment;
generating from the three-dimensional map a two-dimensional map indicating objects in the environment based on height information included in the first information; and
determining, based on the first information and the two-dimensional map, the control values for preventing the cargo and the object from coming closer than a predetermined distance in the two-dimensional map.

* * * * *